United States Patent
Weber et al.

(10) Patent No.: US 6,418,611 B1
(45) Date of Patent: Jul. 16, 2002

(54) PROGRESSIVE DIE MACHINE

(75) Inventors: Ronald E. Weber, Belmont; Wade R. Pennington, Sparta; Dennis M. Willyard, Rockford; Jeffrey A. Lawrence, Jenison, all of MI (US)

(73) Assignee: GR Spring & Stamping, Inc., Grand Rapids, MI (US)

( * ) Notice: Subject to any disclaimer, the term of this patent is extended or adjusted under 35 U.S.C. 154(b) by 0 days.

(21) Appl. No.: 09/097,692

(22) Filed: Jun. 16, 1998

Related U.S. Application Data

(60) Provisional application No. 60/049,847, filed on Jun. 17, 1997.

(51) Int. Cl.[7] .................................................. B23P 23/00
(52) U.S. Cl. ...................... 29/564.6; 29/721; 29/33 Q; 29/33 S; 72/404; 72/338; 72/446; 72/405.01; 72/405.09; 72/405.1; 72/405.11
(58) Field of Search .................... 29/721, 33 Q, 29/33 S, 564.7, 564.6; 72/404, 405.01, 405.06, 405.07, 405.08, 405.09, 405.1, 405.11, 405.13, 405.15, 338, 446

(56) References Cited

U.S. PATENT DOCUMENTS

| | | |
|---|---|---|
| 2,539,467 A | 1/1951 | Pechy |
| 2,742,802 A | 4/1956 | Clarke et al. |
| 3,525,247 A | 8/1970 | Brauer et al. |
| 3,559,604 A | 2/1971 | Ruehleman |
| 3,673,834 A | 7/1972 | Brunner et al. |
| 4,046,040 A | 9/1977 | Bourdo |
| 4,059,889 A | 11/1977 | Randolph et al. |
| 4,088,005 A | 5/1978 | Starr |
| 4,099,043 A | 7/1978 | Rozmus |
| 4,326,402 A | 4/1982 | Wallis |
| 4,342,214 A | 8/1982 | Neuendorf |
| 4,391,358 A | 7/1983 | Haeger |
| 4,420,674 A * | 12/1983 | Jordan ........................ 219/99 |
| 4,548,066 A | 10/1985 | Martinez et al. |
| 4,575,607 A | 3/1986 | Rozmus |
| 4,592,220 A | 6/1986 | Martinez et al. |
| 4,603,567 A | 8/1986 | Smith et al. |
| 4,610,156 A | 9/1986 | Kaminski et al. |
| 4,617,207 A * | 10/1986 | Oboshi et al. ................. 72/404 |
| 4,633,720 A | 1/1987 | Dybel et al. |
| 4,750,131 A | 6/1988 | Martinez |
| 4,755,952 A | 7/1988 | Johns |
| 4,802,357 A | 2/1989 | Jones |
| 4,939,665 A | 7/1990 | Gold et al. |
| 5,007,275 A | 4/1991 | Voss |
| 5,119,311 A | 6/1992 | Gold et al. |
| 5,191,960 A | 3/1993 | Wareham |
| 5,218,756 A | 6/1993 | Zaleski |
| 5,247,825 A | 9/1993 | Erickson |
| 5,271,140 A * | 12/1993 | Futamura et al. ........... 29/33 K |
| 5,275,031 A | 1/1994 | Whiteside et al. |
| 5,331,836 A | 7/1994 | Cudzik |
| 5,349,740 A | 9/1994 | Neuenschwander |
| 5,359,763 A | 11/1994 | Neuenschwander |
| 5,377,115 A | 12/1994 | Neuenschwander |
| 5,553,477 A | 9/1996 | Eisensmith et al. |
| 5,584,204 A | 12/1996 | Yoshino |
| 5,592,733 A | 1/1997 | Wareham |

FOREIGN PATENT DOCUMENTS

JP            409019769       *   1/1977

* cited by examiner

*Primary Examiner*—S. Thomas Hughes
*Assistant Examiner*—John C. Hong
(74) *Attorney, Agent, or Firm*—McGarry Bair LLP

(57) ABSTRACT

An apparatus for serially making formed parts from a web of deformable material with a stud mounted therein having a plurality of progressive die forming stations for forming multiple parts from the web by advancing the web through each forming station. In one embodiment, the apparatus has feeding, driving and transfer mechanisms for controlling the feeding and insertion of studs at spaced locations into the web.

59 Claims, 11 Drawing Sheets

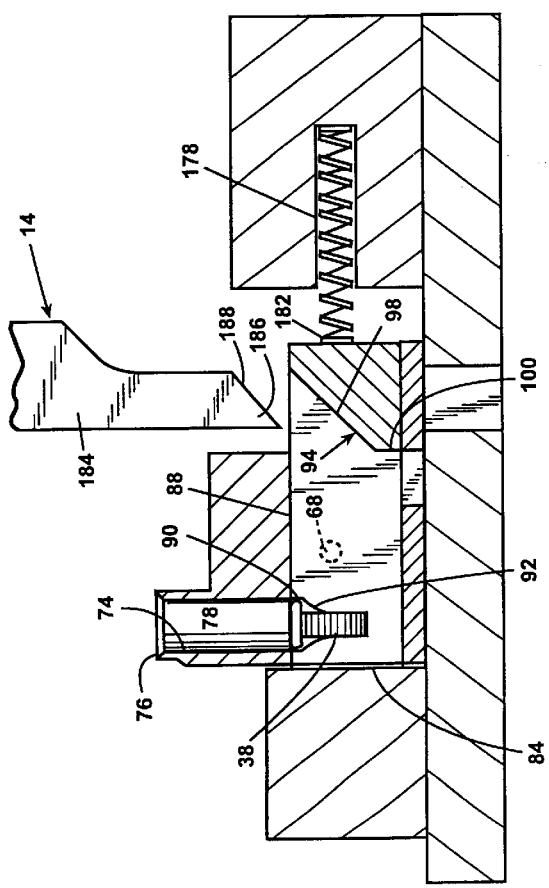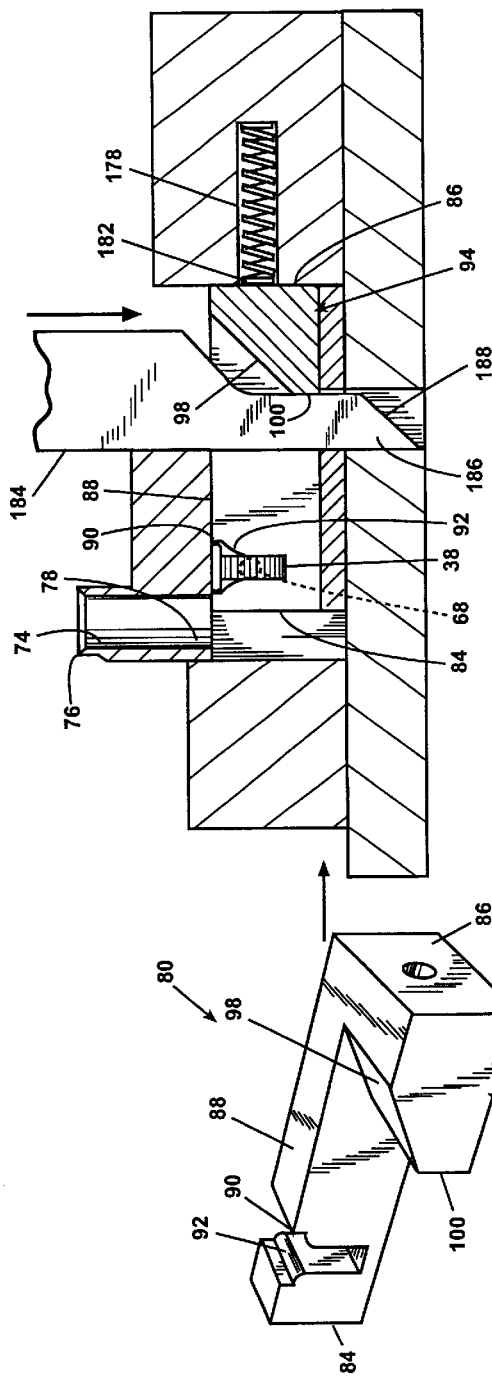

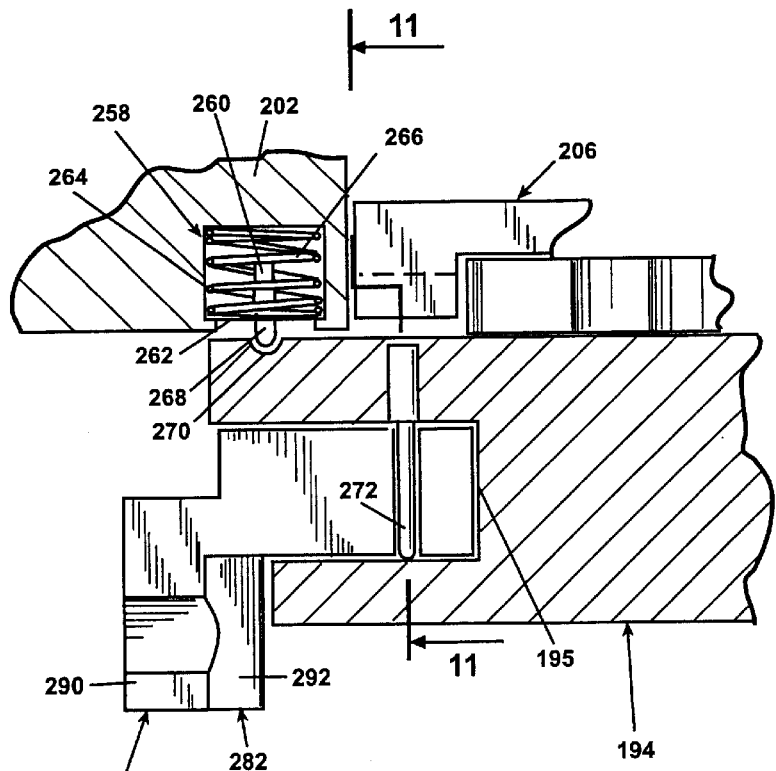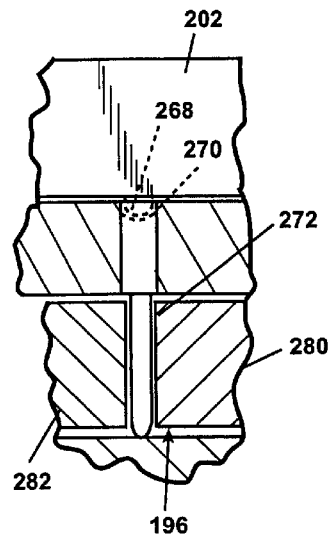
Fig. 10  Fig. 11
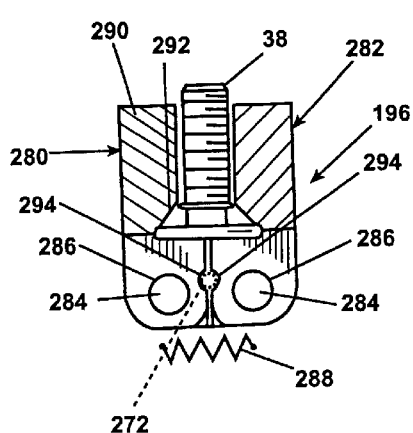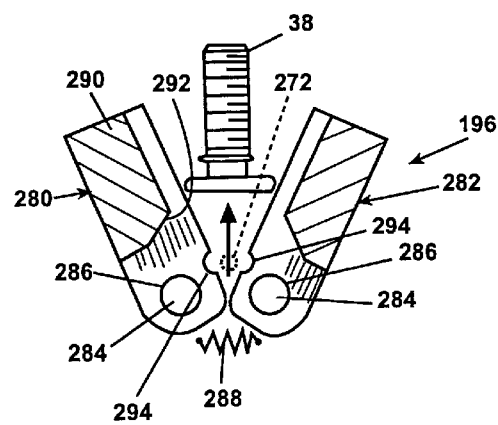
Fig. 12  Fig. 13

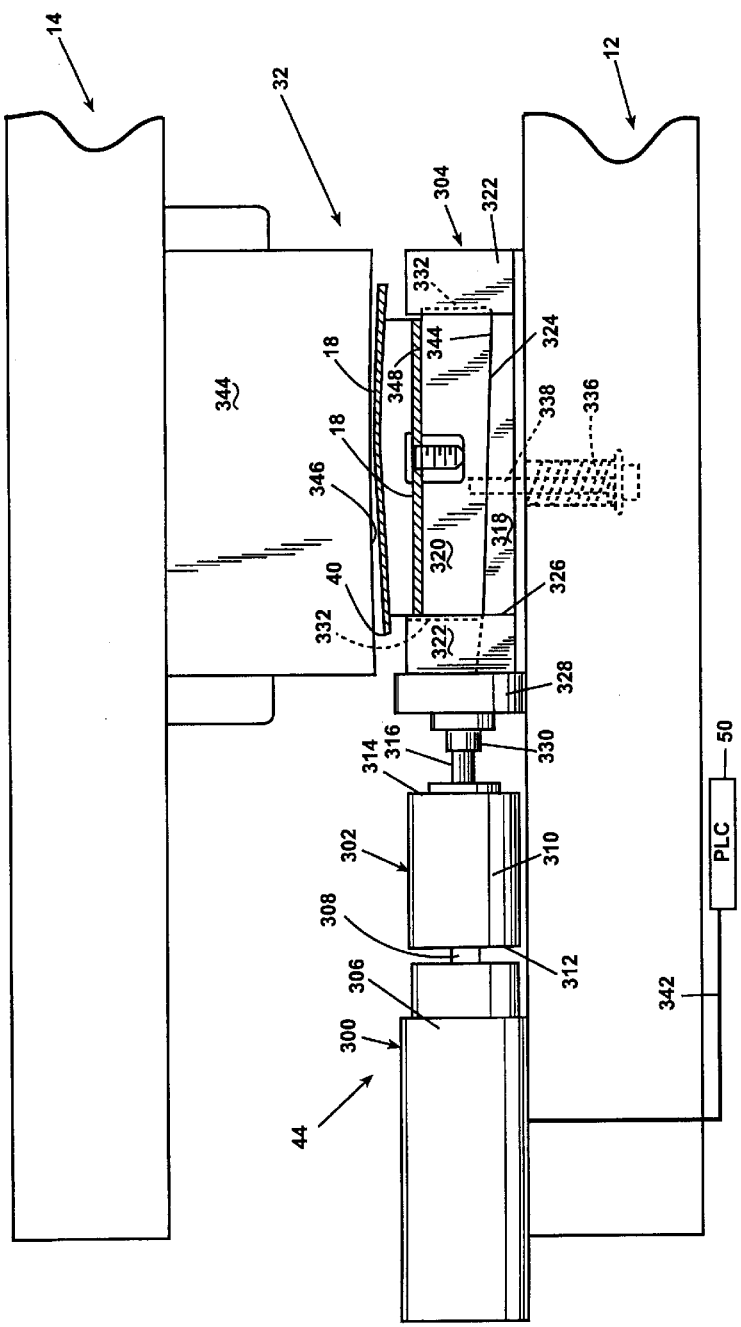
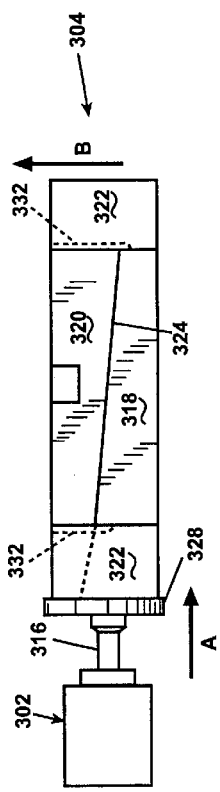
Fig. 16
Fig. 17

PROGRESSIVE DIE MACHINE

CROSS-REFERENCE TO RELATED APPLICATIONS

This Application claims the benefit of U.S. patent application Ser. No. 60/049,847, filed Jun. 17, 1997.

BACKGROUND OF THE INVENTION

1. Field of the Invention

This invention relates to a progressive die machine having a stud-feeding apparatus mounted thereto which is configured to drive a stud, bolt, nut or other fastener into a web being passed through the progressive die machine.

2. Description of the Related Art

Progressive die machines have long been known in the art to comprise a fixed lower die and an upper die which is reciprocally movable with respect to the lower die. The upper die is typically slidably mounted within rails which constrain the upper die to vertical movement therein. In addition, a motor having an output shaft is provided. The output shaft typically has a distal end provided with a concentrically-mounted plate thereon which, in turn, has an eccentrically-mounted pin adjacent an outer radial edge thereof. Further, a ram is provided which has one end mounted to an upper surface of the die and an opposite end having a bearing which is journaled to the pin of the motor. Thus, as rotational motion is imparted to the output shaft by the motor, the pin is rotated as well and traces a circular path. As a result, the ram, in conjunction with the upper die, is moved reciprocally within the rails with respect to the lower die.

Each rotation of the output shaft of the motor is referred to as the "stroke" of the machine and ranges between 0 and 360 degrees. Thus, the point at which the pin on the plate of the motor output shaft is located at the uppermost vertical position with respect to the plate is referred to as the 0 degree position or "top dead center" (TDC). At TDC, the upper die is positioned the greatest extent above the lower die. The point at which the pin on the plate of the motor output shaft is located adjacent to the lowermost vertical position with respect to the plate is referred to as the 180 degree position. In the 180 degree position, the upper die is positioned adjacent to the lower die and is the position whereby the forming operations are performed on the web. Between the 0 and 180 degree positions, the upper die is lowered with respect to the lower die and between the 180 and 360 degree positions, the upper die is raised with respect to the lower die.

The upper and lower dies cooperate to define several forming stations therein. Each forming station includes an individual forming tool and a die which are configured and dimensioned so that a particular predetermined operation can be performed on a web fed between the upper and lower dies. The web is typically an elongated strip of material provided as a feedable supply adjacent the machine, such as on a spool. The progressive die machine typically includes a feeding apparatus mounted adjacent the lower die which sequentially advances the web between the upper and lower dies and through each of the forming stations therein.

The number of forming stations is determined by the number of forming operations necessary to form a desired part. A portion of each of the forming tools are located on the upper die and are driven in unison in reciprocal fashion by the ram. Thus, a forming operation is performed at each forming station during each stroke of the ram.

Following each stroke, the web is advanced so that each portion of the web is positioned within the next successive forming station in the machine. When a portion of the web has passed each forming station in the progressive die machine, a desired part is formed. The last station in the machine typically includes a severing tool and a discharge chute. The severing tool cuts the formed part from the web so that the formed part can fall into the discharge chute and be accumulated therein.

The above-described machine typically forms a completed part. However, it has been found that some parts require additional manufacturing operations to be performed thereon before the part is ready for shipping to customers. One such additional operation is the staking of a stud, such as a threaded fastener, into the formed part after it has been completed. Typically, an aperture is provided in the part by the progressive die machine and the stud is located in the aperture after the progressive die machine has completed the forming process. The staking of the stud often requires an additional manufacturing apparatus and/or substantial human intervention to complete the part which can add to the per unit cost of producing the part. Prior art progressive die machines have been insufficient in providing a solution to this problem.

In addition, the formed part may have a geometrical configuration which makes the staking of a stud therein prohibitively difficult. For example, a part can be provided with a C-shaped configuration whereby the stud is desired to be located within an interior surface thereof. Depending upon the clearance provided within the interior surface, it is often difficult to accurately stake the stud therein. Thus, the formed part must either not include the stud or the formed part must be bent to a lesser a degree than is required. After the part has been formed by the progressive die machine, the stud must be staked therein by a separate apparatus and process, and then the part must be further bent to place the formed part within required tolerance limits.

Additional problems are encountered by the progressive die machines. Changes in a wide variety of uncontrollable characteristics can cause the formation of parts which do not fall within tolerances required by a particular application for a part. Such tolerances can be of critical importance because a part which falls outside of these tolerances can cause a catastrophic failure in the system or machine in which the part is ultimately installed. Some examples of the uncontrollable characteristics encountered by prior art progressive die machines include: changes in thickness in the web material from which the parts are formed, flaws in the web material, wear on the forming tools and dies and foreign matter located on the web material. These characteristics can cause the formation of unacceptable parts by the progressive die machine which can often go undetected by the machine or its operator during use.

SUMMARY OF THE INVENTION

The invention relates to an apparatus for serially making formed parts from a web of deformable material with a stud mounted therein comprising a plurality of progressive die forming stations for forming multiple parts from the web by advancing the web through each forming station, a feeding mechanism for feeding studs seriatim to a predetermined dispensing position adjacent to the web, a driving mechanism adjacent to the web for inserting studs in spaced locations into the web, a transfer mechanism operably connected to the feeding mechanism for receiving studs from the feeding mechanism and for transferring studs to the driving mechanism, and a cutting station for severing the web after the web has passed through the die forming stations to separate the formed individual stud-bearing parts from the web.

The driving mechanism can be located adjacent to one of the die forming stations whereby the studs are inserted into the web as the parts are formed in the progressive die forming stations. The die forming stations can further comprise a movable die having a driving ram associated therewith to reciprocate the movable die between a retracted and a deforming position to deform the web as the web is advanced through the forming stations. The driving ram is preferably operably connected to the driving mechanism to actuate the driving mechanism for inserting a stud into the web when the movable die is moved between the retracted and deforming positions. The operable connection between the driving ram and the driving mechanism preferably comprises one of a flange and a socket disposed on the movable die, and the other of the flange and the socket located on the driving mechanism whereby when the movable die is moved between the retracted and the deforming positions the flange is received in the socket.

The feeding mechanism can be positioned adjacent one of the forming stations and is operably interconnected with the driving ram to index the seriatim feeding of the studs when the movable die is moved between the retracted and deforming positions. The feeding mechanism can comprise a shuttle car movable between a receiving position and a dispensing position and having an opening for receiving one of the studs therein when in the receiving position. The opening in the shuttle car is preferably aligned with a conduit in the feeding mechanism. One end of the conduit is preferably aligned with the opening in the shuttle car when in the dispensing position and the other end of the conduit is preferably aligned with the transfer mechanism. The shuttle car can have a cam follower and a cam operably connected to the driving ram in register with the cam follower for moving the shuttle car from the receiving position to the dispensing position as the movable die moves between the retracted and deforming positions.

The feeding mechanism can further comprise an actuator mounted adjacent to the shuttle car and adapted to move the stud out of the opening in the shuttle car into the conduit when the shuttle car is moved to the dispensing position. The actuator can comprise a pressurized air nozzle in register with the opening of the shuttle car in the dispensing position whereby air exiting the nozzle moves the stud into the conduit. The feeding mechanism can further comprise a lever mounted adjacent to an end of the conduit having a stop thereon movable between an obstructing position and a release position and a cylinder having an axially-movable piston having an actuator portion thereon in register with the lever. The piston is preferably movable between a first position wherein the actuator portion positions the lever in the obstructing position and a second position wherein the actuator portion positions the lever in the release position and forces the stud out of an exit of the conduit and into the transfer mechanism. The piston can further comprise a stud-receiving indentation which receives the stud as the piston moves from the first position to the second position for restricting the movement of the stud in a single linear direction.

The transfer mechanism can be positioned adjacent one of the forming stations and operably interconnected with the driving ram to index the seriatim feeding of the studs between the feeding mechanism and the driving mechanism when the movable die is moved between the retracted and deforming positions. The transfer mechanism can comprise a support plate and at least one set of gripping members mounted to the support plate and adapted to selectively grip a stud. The support plate is preferably mounted for movement of the at least one set of gripping members between the feeding mechanism and the driving mechanism. The at least one set of gripping members receive and grip a stud from the feeding mechanism, travel with the support plate to the driving mechanism, and release the stud at the driving mechanism. The transfer mechanism can further comprise an arm mounted to the support plate through a ratchet mechanism to selectively position the support plate at a number of discrete positions between the feeding mechanism and the driving mechanism. The arm can have a flange operably coupled to the driving ram so that the arm positions the support plate at a next discrete position as the movable die moves between the retracted and deforming positions. The at least one set of gripping members can comprise multiple sets of gripping members mounted to the support plate. One of the sets of gripping members can be positioned at the feeding mechanism while another of the sets of gripping members can be simultaneously positioned at the driving mechanism at each discrete position of the support plate.

The driving mechanism is preferably positioned adjacent one of the forming stations and is operably interconnected with the driving ram to index the seriatim insertion of the studs into the web when the movable die is moved between the retracted and deforming positions. The driving mechanism can comprise a driving mechanism housing, a hammer slidably mounted within the housing and adjacent to the transfer mechanism for forcing each of the studs into the web, and a lever mounted to the housing for movement between a rest position and an insertion position and having a first end and a second end. The first end is operably connected to the driving ram and the second end is in register with the hammer. The hammer receives one of the studs when the lever is in the rest position and is moved by the lever to insert the stud into the web when the lever moves between the rest and insertion positions. The lever is moved between the rest position and the insertion position when the movable die is moved between the retracted position and the deforming position.

The die forming stations can further comprise a movable die having a driving ram associated therewith to reciprocate the movable die between a retracted and a deforming position to deform the web as the web is advanced through the forming stations. The driving ram preferably is operably connected to the driving mechanism to actuate the driving mechanism for inserting a stud into the web when the movable die is moved between the retracted and deforming positions. The operable connection between the driving ram and the driving mechanism preferably comprises one of a flange and a socket disposed on the movable die, and the other of the flange and the socket located on the driving mechanism. Thus, when the movable die is moved between the retracted and the deforming positions, the flange is received in the socket.

In an additional aspect, the invention relates to a method for serially making formed parts from a web of deformable material with a stud mounted therein comprising the steps of providing a plurality of progressive die forming stations for forming multiple parts from the web, advancing the web through each forming station, feeding multiple studs seriatim to a predetermined dispensing position adjacent to the web, inserting each stud at spaced locations into the web, and severing the web after the web has passed through the die forming stations to separate the formed individual stud-bearing parts from the web.

The method can comprise additional steps such as: providing a movable die with a driving ram associated therewith, and reciprocating the movable die between a retracted and a deforming position to deform the web as the web is advanced through the forming stations. At least one stud can be indexed toward the dispensing position when the movable die is moved between the retracted and deforming positions. At least one stud can be inserted into the web when the movable die is moved between the retracted and deforming positions. A stud can be moved from the dispensing position to an insertion position adjacent to the web when the movable die is moved between the retracted and deforming positions. The dimensional relationship between the first and second dies in the deforming position can be adjusted responsive to a remote signal.

Other objects, features, and advantages of the invention will be apparent from the ensuing description in conjunction with the accompanying drawings.

BRIEF DESCRIPTION OF THE DRAWINGS

In the drawings:

FIG. 4 is cross-sectional view of the stud-staking assembly taken along lines 4—4 of FIG. 2 showing a stud positioned in a conduit while an upper die is in a raised position with respect to the lower die of the progressive die machine;

FIG. 5 is a cross-sectional view of the stud-staking assembly taken along lines 5—5 of FIG. 2 showing the stud positioned in a conduit while the upper die is in a lowered position with respect to the lower die of the progressive die machines;

FIG. 6 is an enlarged perspective view of a slidable car shown in FIGS. 4–5 which is adapted to be moved by the upper die during operation of the progressive die machine;

FIG. 10 is a cross-sectional view of the rotary feed mechanism of FIG. 2 showing the interengagement of a pin on a housing with an aperture on the rotatable plate;

FIG. 11 is an enlarged end view of the pin of FIG. 10;

FIG. 12 is a diagrammatic side elevational view of a pair of gripping arms on the rotary feed mechanism shown in receipt of a stud therein;

FIG. 13 is a diagrammatic side elevational view of the gripping arms of FIG. 12 shown biased into an open position wherein a stud is released from retention therein;

FIG. 16 is a front elevational view of the bending apparatus of FIG. 1 shown in a lowered position with respect to the upper die;

FIG. 17 is a diagrammatic front view of the bending apparatus of FIG. 16 shown in a raised position;

DETAILED DESCRIPTION OF THE PREFERRED EMBODIMENTS

Figure 1:
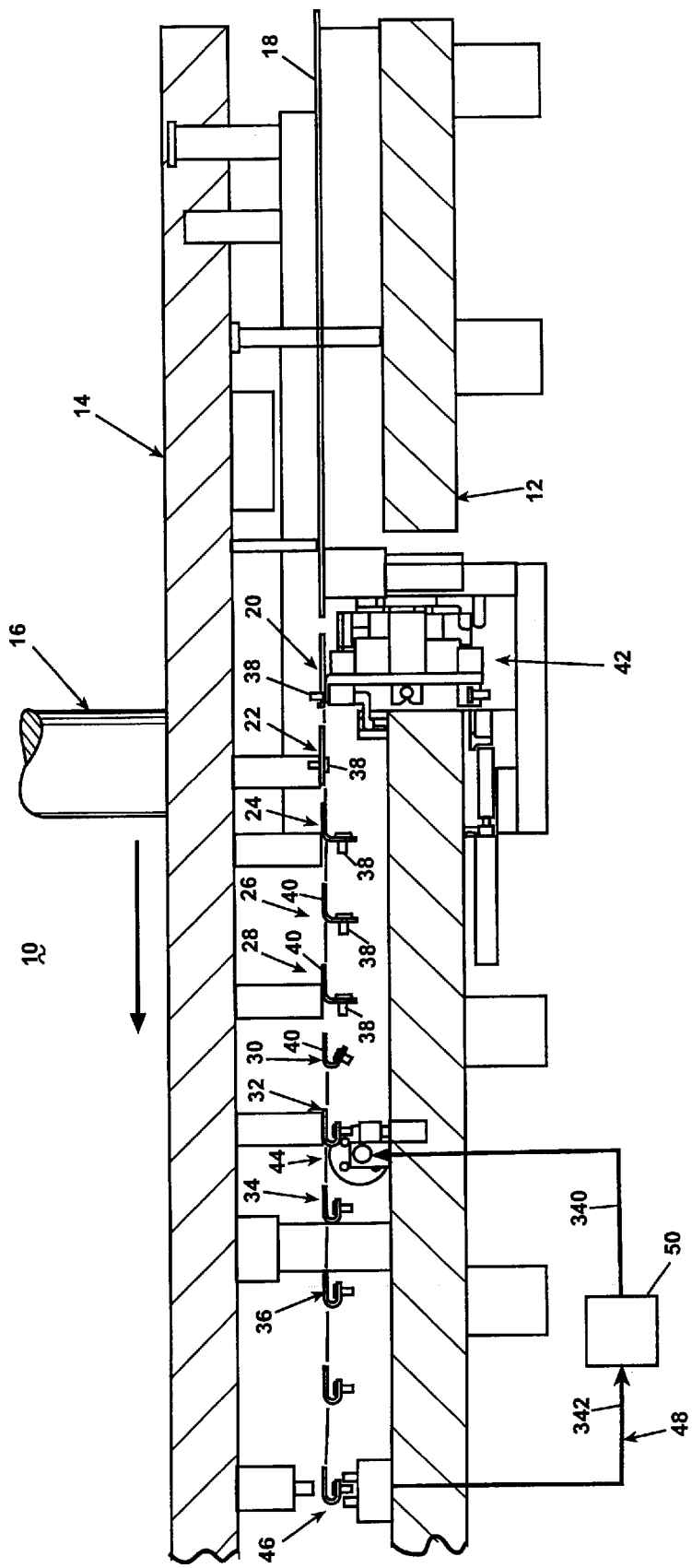
FIG. 1 is a diagrammatic view from a side elevational perspective showing a progressive die machine according to the invention which has a stud-staking apparatus, a bending apparatus, and a measuring apparatus located adjacently or mounted thereto.

Referring now to the drawings and to FIG. 1 in particular, a progressive die machine 10 is shown comprising a lower die 12 and an upper die 14 which is connected to a ram 16. It will be understood that the progressive die machine 10 is generally configured and operates as described in the "Background of the Invention" section. Thus, it will be further understood that the ram 16 is interconnected to a conventional motive apparatus (not shown) which imparts a reciprocal motion to the ram 16. The reciprocal motion imparted to the ram 16 in turn reciprocates the upper die 14 with respect to the lower die 12 in accordance with what is generally known to those skilled in the art relating to progressive die machines.

A web of material 18 is shown in FIG. 1 being fed longitudinally between the lower and upper dies 12 and 14, respectively. Further, several forming stations are formed on the lower and upper dies 12 and 14, some of which are shown by reference numerals 20–36. A progressive die machine 10 further includes an advancing mechanism (not shown) whereby the web 18 is advanced between the lower and upper dies 12 and 14 in discrete steps so that a particular portion of the web 18 is positioned adjacent each of the forming stations 20–36. It will be understood that the forming stations 20–36 perform a particular tooling, contouring, or other forming operation on a particular portion of the web 18. It will be further understood that additional or fewer forming stations 20–36 can be provided without departing from the scope of this invention. It will also be understood that the forming stations 20–36 can also be idle stations or have other functions besides forming.

FIG. 1 shows the web 18 having several individual portions thereof located adjacent forming stations 20–36. The web 18 is shown being formed into a part having a stud 38 mounted into the web at forming station 20 and eventually being bent into a C-shaped configuration by later forming stations. The staking of the stud 38 into the web 18 at forming station 20 is performed by a stud-staking apparatus 42 which is described in greater detail below and shown in FIGS. 2–15.

The part 40, having the stud 38 staked therein, is finally formed into a C-shaped configuration as it approaches forming station 32 by a bending apparatus 44 which performs a final bending operation on the part 40 to provide the C-shaped configuration thereto. A measuring apparatus 46 is located downstream from the forming stations 20–36. The measuring apparatus 46 measures the final dimensions of each part 40 passing therethrough and provides a signal through feedback loop 48, which, in turn, signals a PLC 50 to control the bending apparatus 44. The PLC 50 notes dimensions or other characteristics measured by the measuring apparatus 46 and determines whether the parts 40 passing through the measuring apparatus 46 are within a set of predetermined tolerance limits. It will be understood that, although the measuring apparatus 46 is shown between the lower and upper dies 12 and 14, the measuring apparatus can also be a separate component located downstream therefrom.

Figure 18:
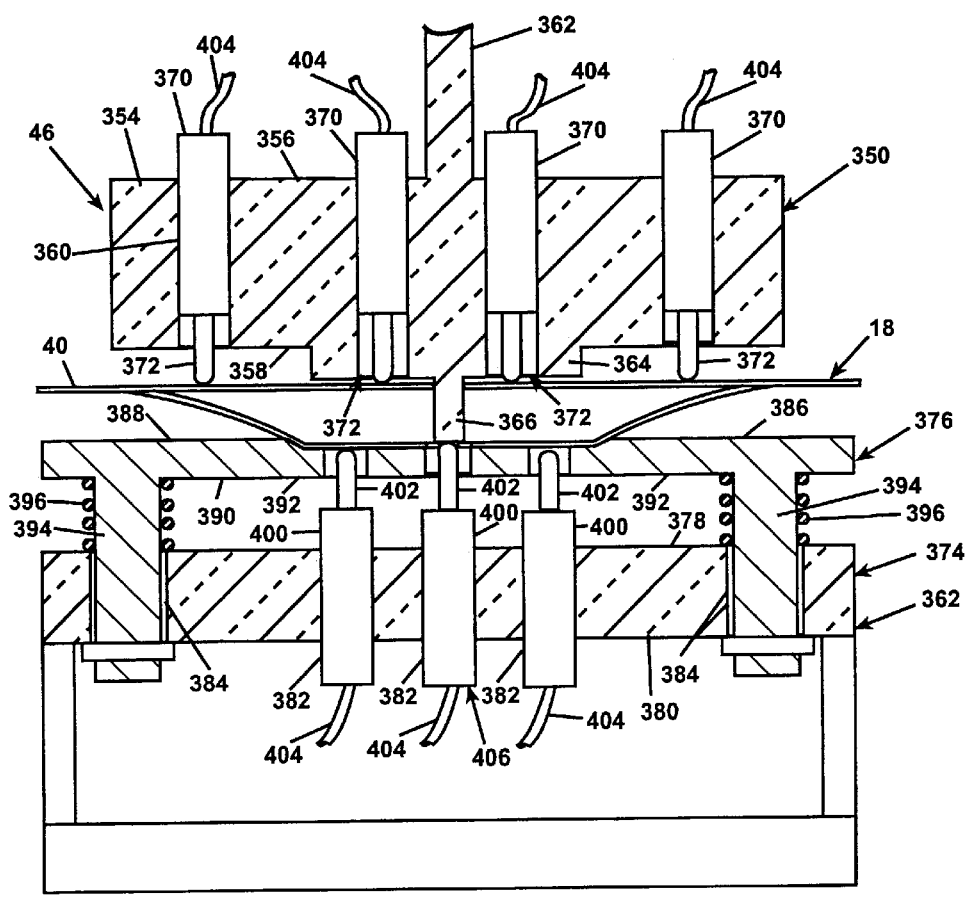
FIG. 18 is a front cross-sectional view of the measuring apparatus of FIG. 1.

If the parts 40 passing through the measuring apparatus are not within the predetermined tolerance limits, the PLC 50 sends a signal to the bending apparatus 44 to provide a greater or lesser degree of bending to the part 40 located at the bending apparatus 44. All parts 40 later fed through the bending apparatus 44 are thereby formed by the bending apparatus in accordance with the signal from the PLC 50. The bending apparatus 44 is shown in FIGS. 16–17. The measuring apparatus 46 is shown in FIG. 18. This process is described in greater detail in FIG. 19.

As shown in FIGS. 2–15, the stud-staking apparatus 42 comprises a positioning mechanism 52 and a staking mechanism 54. The positioning mechanism 52 is adapted to receive a stud 38 and position the stud 38 within the staking mechanism 54 whereby the staking mechanism 54 can then mount the stud 38 within a part 40 formed within the web 18.

Figure 2:
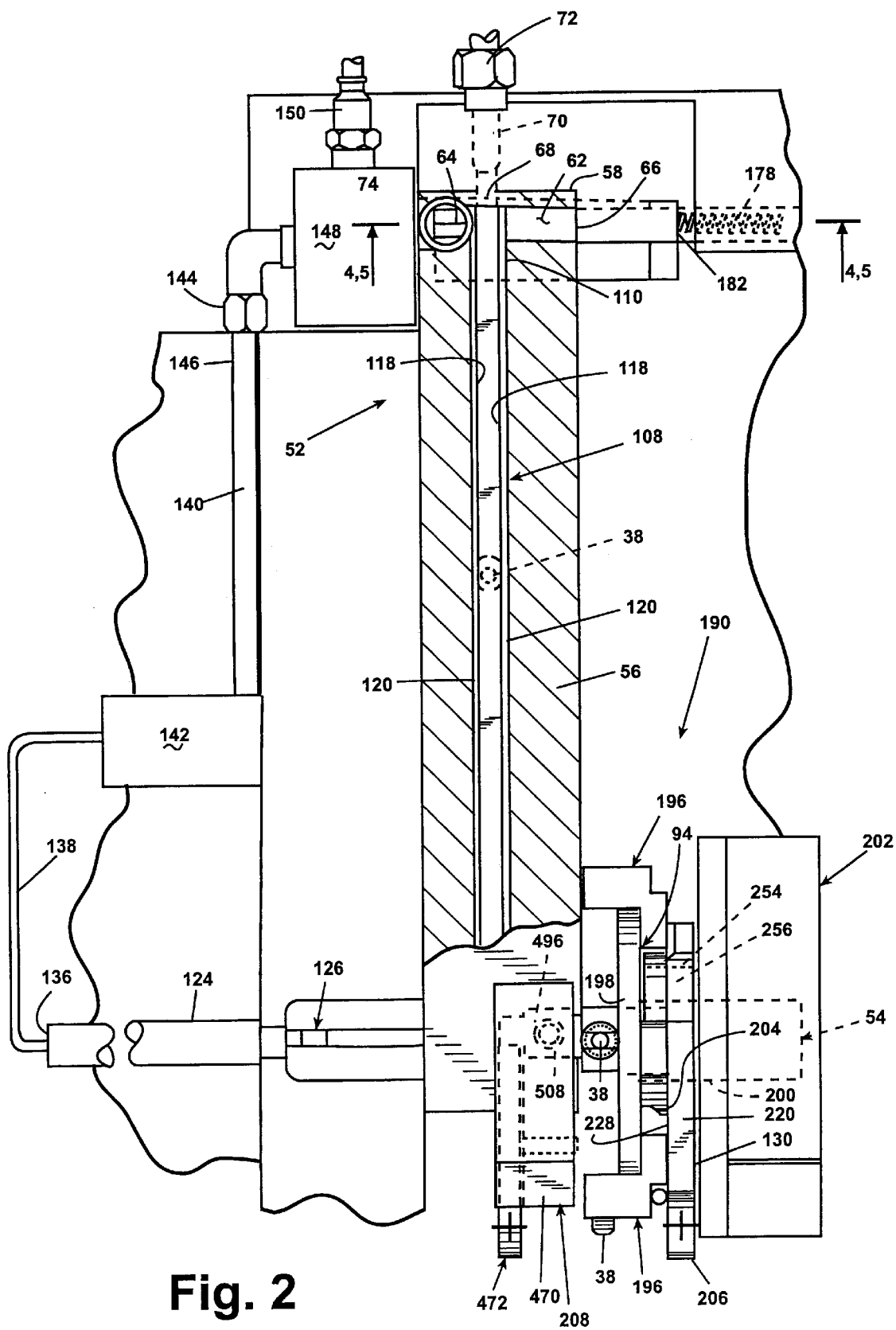
FIG. 2 is a fragmentary top plan view of a portion of a lower die of the progressive die machine of FIG. 1 which illustrates a stud-staking assembly contained therein and has a portion of the lower die shown in cross section to provide a clear illustration of the assembly.
Figure 3:
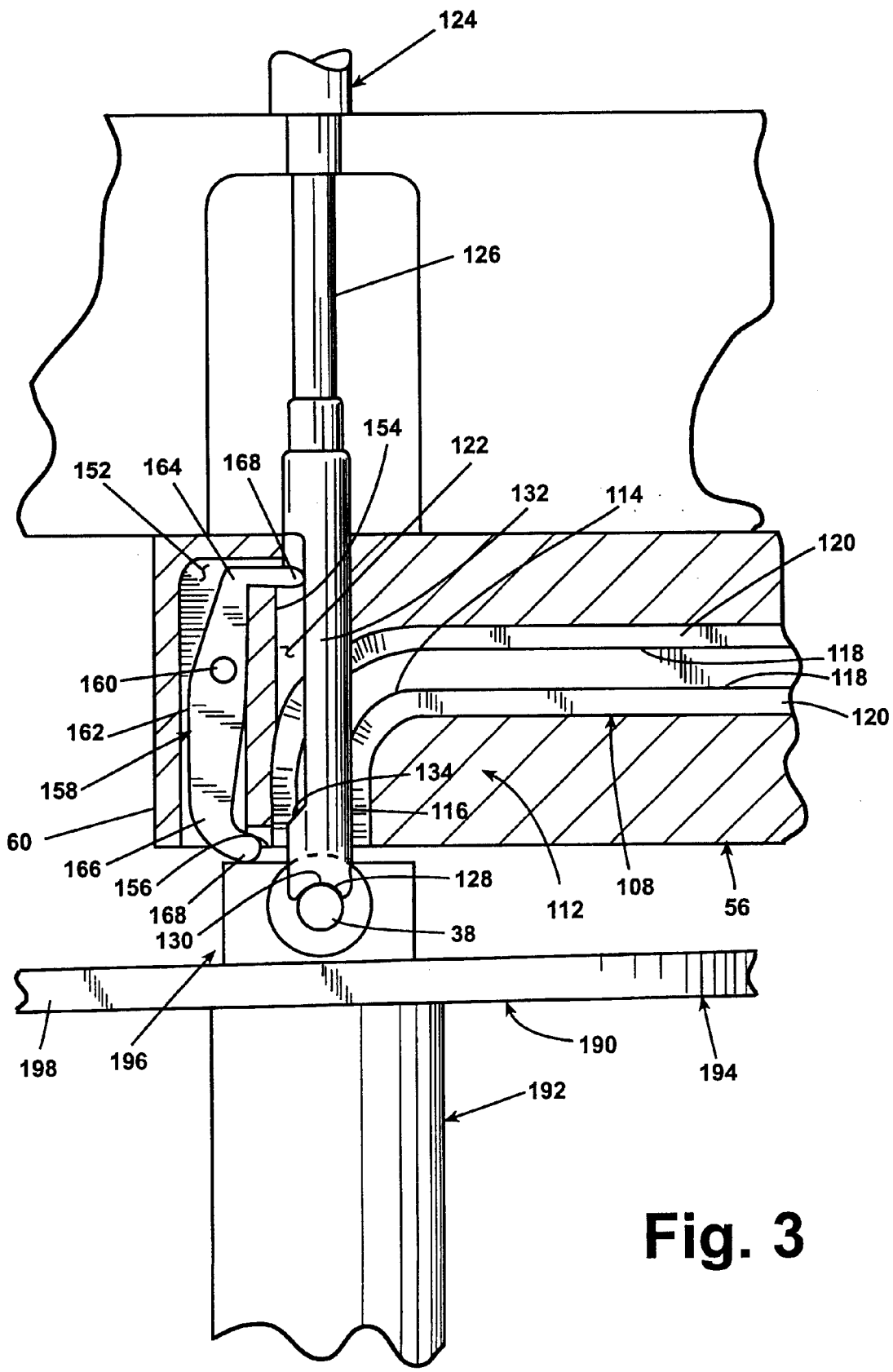
FIG. 3 is an enlarged fragmentary top plan view of the stud-staking assembly shown in FIG. 2 provided with a portion thereof in cross section to provide additional illustration of a cylinder urging an infed stud into engagement with a rotary feed mechanism located adjacently thereto.

The positioning mechanism 52 is shown in detail in FIGS. 2–3 and comprises an elongated body 56 having a first end 58 and a second end 60. The first end 58 of the body 56 includes a transverse passage 62 which extends laterally across the elongated body 56. The passage 62 has a first end 64 and a second end 66. An aperture 68 is formed in the first end 58 of the body 56 which extends into the passage 62 intermediate the first and second ends 64 and 66 thereof. The aperture 68 extends into a conduit 70 which extends axially from the first end 58 of the body 56 and is interconnected by a fitting 72 to a source of pressurized fluid, preferably air. It will be understood that the source of pressurized air interconnected to fitting 72 can either be supplied as a continuous stream or as intermittent bursts of air as required.

As shown in FIGS. 2–3 and in greater detail in FIGS. 4–5, a conduit 74 extends upwardly from the first end 58 of the body 56 and is in communication with the first end 64 of the passage 62 therein. It will be understood that the conduit 74 is of sufficient size to allow a stud 38 to travel axially therethrough without restriction. The conduit 74 has a first end 76 and a second end 78. The first end 76 is preferably interconnected to a supply of studs 38 whereby the studs 38 can be selectively supplied to the first end 76 of the conduit 74. It will be understood that the supply of studs interconnected to the first end 76 of the conduit 74 can comprise a magazine of studs, a manual supply, or an automatic supply whereby studs are supplied to the first end 76 of the conduit 74 such as by compressed air being blown behind the stud so that the stud 38 travels toward the second end 78 of the conduit 74. The second end 78 of the conduit 74 can be provided with an inwardly-extending frustoconical wall as shown in FIGS. 4–5 so that a stud 38 is centered axially with respect to the second end 78 of the conduit 74 as the stud 38 enters therein.

A car 80 is slidably mounted to the first end 58 of the body 56 so that the car 80 can traverse generally parallel with the passage 62 therein. As shown in FIGS. 4–5 and in greater detail in FIG. 6, the car 80 comprises an elongated body 82 having a first end 84 and a second end 86. The car 80 further is provided with an upper surface 88 thereon. The upper surface 88 is provided with a first aperture 90 adjacent the first end thereof. The first aperture 90 extends downwardly within the body 82 of the car 80 into a bore 92 which has a lateral cross section adapted to substantially conform to an outline shape of a stud 38. The second end 86 of the body 82 has a laterally- and forwardly-extending flange 94 which is provided with a ramped surface 98 which, in turn, terminates in a vertical surface 100.

The car 80 is mounted for slidable movement to the first end 58 of the body 56 between a first and a second position as shown in FIGS. 4 and 5, respectively. A spring 178 is mounted adjacent the second end 86 of the car 80 and the first end 58 of the body 56. A distal end 182 of the spring 178 abuts the second end 86 of the car 80 and biases the car 80 axially outwardly with respect to the spring 178.

In the first position shown in FIG. 4, the progressive die machine 10 is in an open position wherein the upper die 14 is in a raised position with respect to the lower die 12. As shown in FIG. 4, the upper die 14 is provided with a downwardly-depending flange 184 having a distal end 186 provided with an angular surface 188 thereon. The angular surface 188 of the flange 184 preferably conforms generally with the angular orientation of the ramped surface 98 of the car 80. When the upper die 14 is raised with respect to the lower die 12, the flange 184 does not contact the car 80. Thus, the outward bias of the spring 178 causes the car 80 to be biased into the first position wherein the aperture 90 and bore 92 of the car 80 are concentrically aligned with the second end 78 of the conduit 74. Thus, a stud 38 can be delivered through the first end 76 of the conduit 74 and into the bore 92 of the car 80 through the second end 78 of the conduit 74.

In the second position shown in FIG. 5, the upper die 14 has been lowered with respect to the lower die 12 which, in turn, lowers the flange 184 with respect to the car 80. As the flange 184 is lowered, the angular surface 188 on the distal end 186 of the flange 184 is lowered as well so that the angular surface 188 of the flange 184 contacts the ramped surface 98 of the flange 94. As the upper die 14 moves toward the lower die 12, the downward urging of the angular surface 188 of the flange 184 against the ramped surface 98 of the flange 94 causes the car 80 to be moved toward the second position shown in FIG. 5 which also urges the second end 86 of the car 80 against the distal end 182 of the spring 178. The distal end 186 of the flange 184 eventually is lowered a sufficient extent so that the flange 184 abuts the vertical surface 100 of the flange 94 and retains the car 80 in the second position shown in FIG. 5 whereby the bore 92 is aligned with an axial conduit 108 in the body 56. Further, the laterally-extending bore 105 is aligned with the conduit 70 via aperture 68.

When the upper die 14 is raised with respect to the lower die 12, the distal end 186 of the flange 184 is retracted from contact with the flange 94 on the car 80. Once the flange 184 has been lifted a sufficient extent, the angular surface 188 on the distal end 186 thereof once again abuts the ramped surface 98 of the flange 94 which causes the car 80 to be slid towards the first position in conjunction with the outwardly biased distal end 182 of the spring 178 acting against the second end 86 of the car 80. Once the flange 184 is lifted out of engagement with the flange 94, the car 80 is biased into the first position once again by the spring 178 as shown in FIG. 4.

The conduit 108 extends between the first and second ends 58 and 60 of the body 56 which has a first end 110 and a second end 112. The first end 110 of the conduit 108 is preferably concentrically aligned with the aperture 68 in the first end 58 of the body 56. The second end 112 of the conduit 108 preferably includes a curved turn 114 which, in turn, terminates in a lateral extension 116. The conduit 108 is defined by sidewalls 118 which preferably have a cross section substantially conforming to that of a stud 38. In addition, the sidewalls 118 each include a laterally-extending ledge 120 which is adapted to receive a radially-extending body of a stud 38 so that a stud 38 can slide through the conduit 108 in a controlled fashion without accidentally becoming lodged therein. It will be understood that the conduit 108 interconnects the passage 62 in the first end 58 of the body 56 with the staking mechanism 54 located adjacent an exit point of the lateral extension 116 in the second end 60 of the body 56.

As shown in FIG. 3, the second end 60 of the body 56 further includes a transverse passage 122 which extends laterally outwardly from the second end 60 of the body 56 preferably in axial alignment with the lateral extension 116 of the conduit 108. A cylinder 124 having a piston 126 is mounted to the body 56 in concentric alignment with the passage 122 in the second end 60 thereof. A distal end 128 of the piston 126 is provided with a rounded indentation 130. A radius of curvature of the indentation 130 preferably generally corresponds with an outer radius of a body of a stud 38. It will be understood that the piston 126 is axially movable with respect to the cylinder 124 between a first position wherein the distal end 128 of the piston 126 is positioned within the passage 122 and a second position wherein the distal end 128 of the piston 126 is extended within the lateral extension 116 of the conduit 108 a sufficient extent to urge a stud 38 located within the lateral extension 116 outwardly therefrom.

The distal end 128 of the piston 126 is preferably of a width which extends substantially across the width of the passage 122 in the second end 60 of the body 56. At a point intermediate the distal end 128 of the piston 126 and the cylinder 124, the width of the piston 126 preferably decreases to a narrow portion 132. The transition from the wider distal end 128 of the piston 126 and the narrow portion 132 of the piston 126 is preferably formed by a ramped surface 134 as shown in FIG. 3.

As shown in FIG. 2, it will be understood that the cylinder 124 is preferably a pneumatic cylinder whereby the introduction of pressurized fluid to an end 136 of the cylinder 124 causes the piston 126 to be axially extended therefrom. The cylinder 124 preferably has a return spring (not shown) located therein to retract the piston 126 within the cylinder 124 when the pressure of the fluid acting on the end 136 of the cylinder 124 is reduced to a sufficient degree. The cylinder 124 is preferably interconnected to a source of pressurized fluid, such as air, by conduits 138 and 140 which preferably have a relief valve 142 positioned therebetween. A fitting 144 on an opposite end 146 fluidly interconnects the conduit 140 to a manifold 148 which has an additional fitting 150 interconnected to the source of pressurized fluid. It will be understood that the relief valve 142 is preferably a discharge facility for pressurized air which, when actuated, relieves any back pressure in the conduit 138 to the atmosphere which allows the piston 126 to retract quickly within the cylinder 124. Thus, the piston 126 can be extended and retracted from the cylinder 124 at a high velocity in a relatively short period of time. After the burst is relieved by the relief valve 142, the supply of pressurized air can be recharged from the manifold 148.

Referring now to FIG. 3, the second end 60 of the body 56 further includes a recess 152 located intermediate the lateral extension 116 and passage 122 and the second end 60 of the body 56. The recess 152 preferably extends laterally across the second end 60 thereof and has first and second openings 154 and 156 which interconnect the recess 152 with the passage 122 and the lateral extension 116, respectively. A lever 158 is pivotably-mounted within the recess 152 to the body 56 by a pin 160 located intermediate the first and second openings 154 and 156. The lever 158 comprises an elongated body 162 having a first end 164 and a second end 166. Each of the first and second ends 164 and 166 of the body 162 is provided with a flange 168 thereon, each of which extends toward the first end 58 of the body 56.

The lever 158 is pivotable between a first position wherein the flange 168 on the first end 164 of the body 162 extends into the passage 122 and a second position wherein the flange 168 on the second end 166 of the body 162 extends into the lateral extension 116. It will be understood when the lever 158 is located in the second position the flange 168 on the second end 166 of the body 162 extends into the lateral extension 116 a sufficient extent so as to prevent a stud 38 from exiting therefrom.

As the piston 126 is extended from the cylinder 124, the stud 38 is urged against the flange 168 of the second end 166 and causes the stud 38 to pivot the lever 158 out of obstruction of the lateral extension 116. The lever 158 is allowed to pivot because the extension of the piston 126 brings the narrow portion 132 into alignment with the first end 164 providing clearance therefor.

As shown in FIGS. 1–3 and in greater detail in FIGS. 7–15, the staking mechanism 54 includes a rotary feed mechanism 190 mounted adjacent the exit point of the lateral extension 116 in the second end 60 of the body 56. The rotary feed mechanism 190 comprises a cylindrical body 192 having a circular plate 194 rotatably mounted thereto. The plate 194 has several gripping members 196 positioned adjacent an outer radial edge 198 of the plate 194. It will be understood that the figures show eight gripping members 196 mounted in a spaced relationship to the plate 194 about edge 198, however, additional or fewer gripping members 196 can be mounted to the plate 194 without departing from the scope of this invention. The gripping members 196 are preferably mounted to the plate 194 so that a pair of gripping members 196 are located directly opposite from one another along a diametrical axis which passes through the center of the plate 194. It will be understood that a gripping member 196 can be positioned adjacent the lateral extension 116 of the conduit 108 at the second end 60 of the body 56 whereby a stud 38 exiting the lateral extension 116 is received directly by the gripping member 196 positioned adjacently thereto. It will be further understood that a gripping member 196 located on the opposite side of the plate 194 is positioned in an inverted orientation directly beneath the web 18 at forming station 20.

Figure 8:
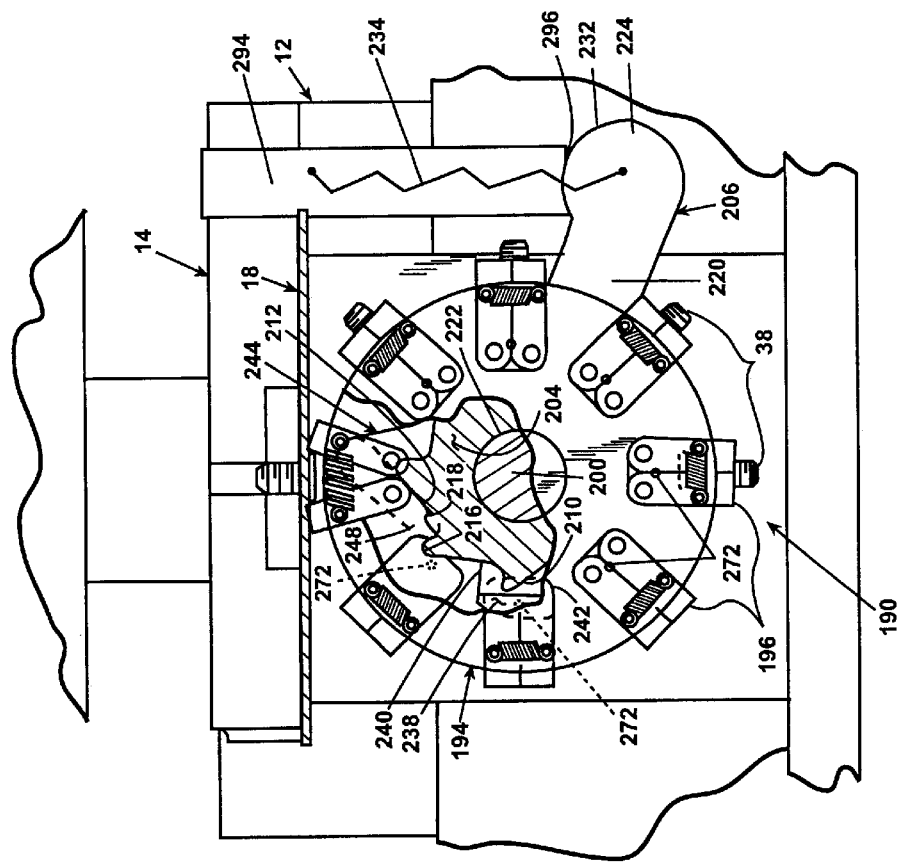
FIG. 8 is a side elevational view of the rotary feed mechanism of FIG. 2 shown with the upper die in a lowered position with respect to the lower die whereby a stud is urged into a web material passing between the upper and lower dies.
Figure 7:
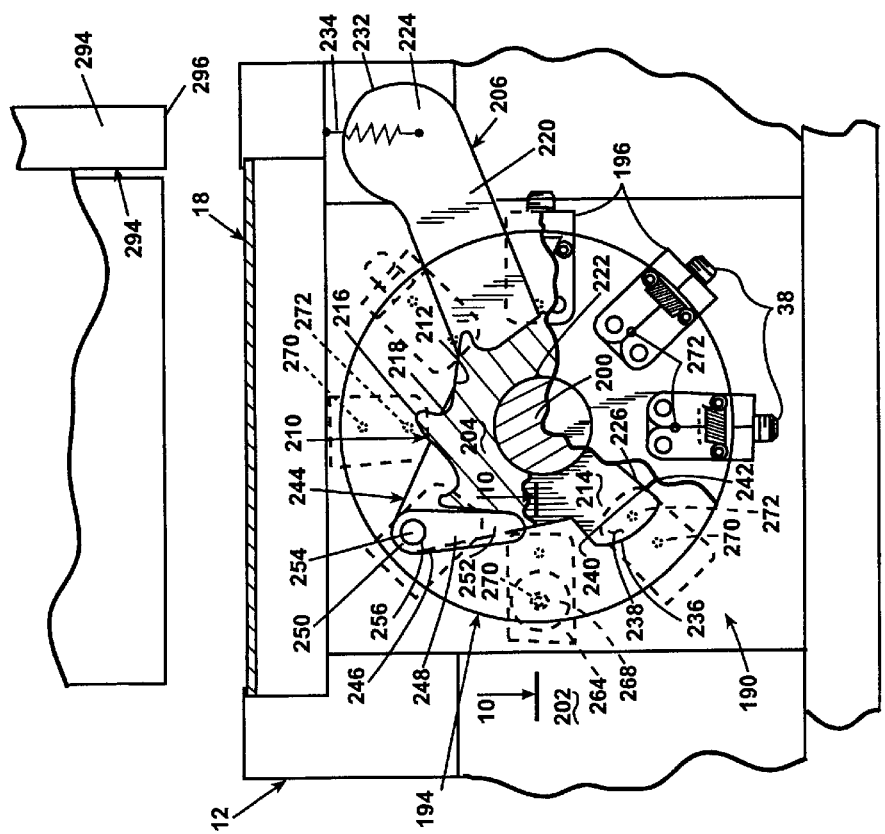
FIG. 7 is a side elevational view of the rotary feed mechanism of FIG. 2 shown with the upper die in a raised position with respect to the lower die.
Figure 9:
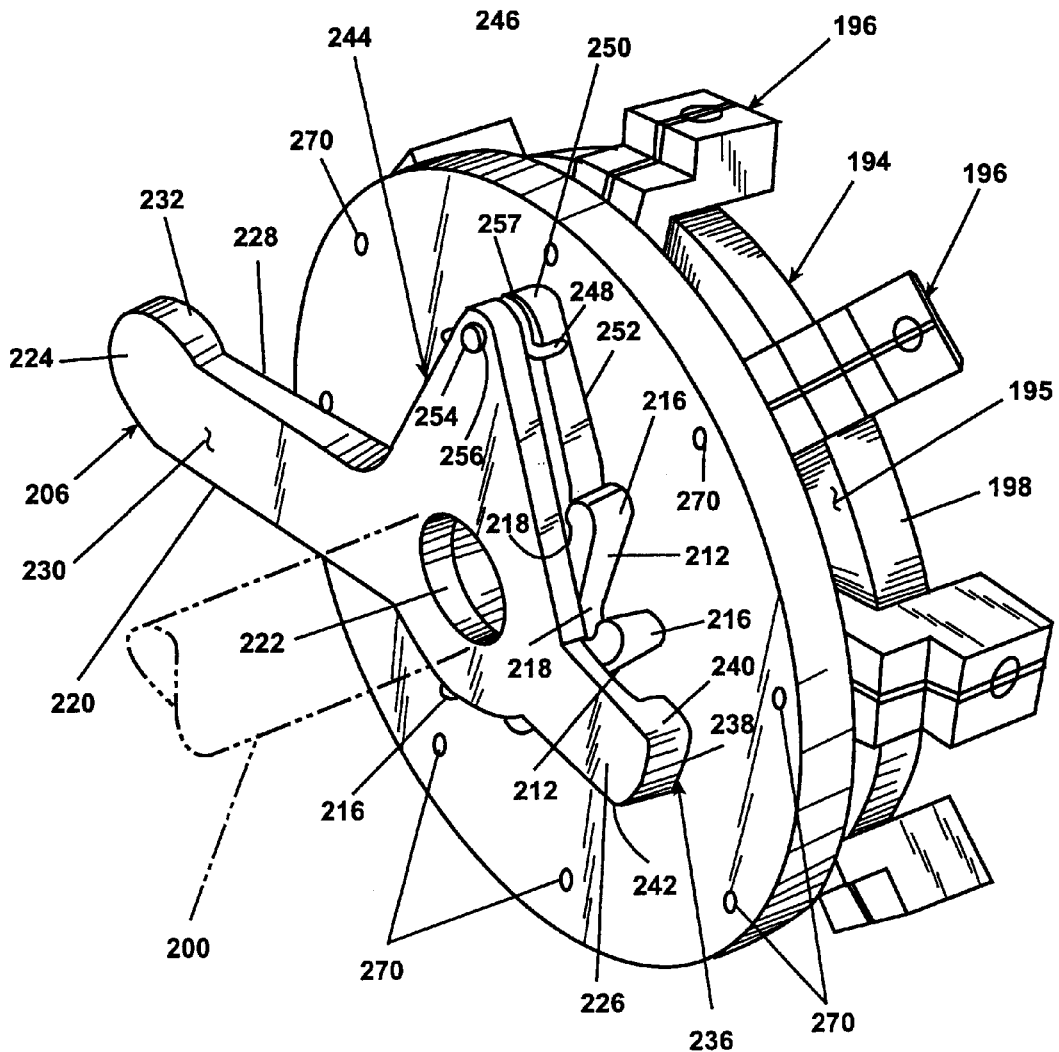
FIG. 9 is an enlarged perspective view of a lever and rotatable plate portion of the rotary feed mechanism of FIG. 2.

Referring to FIGS. 7–9, the plate 194 of the rotary feed mechanism 190 is rotatably mounted upon a shaft 200 of a housing 202. It will be understood that the housing 202 can be fixedly mounted to the lower die 12 or can be provided with its own support adjacently thereto without departing from the scope of this invention. In addition to the plate 194, the rotary feed mechanism 190 further comprises a ratchet 204, a lever 206, and a stud-driving assembly 208 (see FIGS. 14 and 15).

The ratchet 204 is provided on a rearward surface of the plate 194 in concentric alignment with the shaft 200 and has several tangentially-extending teeth 210 thereon. The teeth 210 are each defined by a ramped surface 212 which extends tangentially and radially outwardly from a body 214 of the ratchet 204 and terminates in a rounded peak 216. A side of the peak 216 opposite from the ramped surface 212 extends radially toward the body 214 and terminates in a rounded groove 218. Each groove 218 extends smoothly into the ramped surface 212 of the next successive tooth 210 on the ratchet 204. It will be understood that the number of teeth 210 on the ratchet 204 preferably corresponds to the number of gripping members 196 provided on the plate 194.

The lever 206 comprises an elongated body 220 which has a central aperture 222 journaled upon the shaft 200 and having a first end 224 and a second end 226. The lever 206 further has a forward surface 228 facing the plate 194 and a rearward surface 230 facing the ratchet 204.

The first end 224 of the body 220 of the lever 206 is preferably provided with a laterally-extending rounded flange 232 which is preferably mounted to one of the lower die 12 and the housing 202 via a biasing member 234 which biases the first end 224 of the lever 206 in a counterclockwise fashion about the shaft 200. The lever 206 is preferably movable between a raised position and a lowered position with respect to the shaft 200 as shown in FIGS. 7 and 8, respectively.

As shown in FIGS. 9–11, the forward surface 228 of the second end 226 of the lever 206 is provided with a forwardly extending flange 236. The flange 236 preferably has a forward surface 238 thereon which protrudes therefrom between a first end 240 and a second end 242.

As shown in FIGS. 7–9, a laterally-extending flange 242 is provided on the elongated body 220 of the lever 206 intermediate the first and second ends 224 and 226 thereof. The flange 224 has a rounded distal end 246. A latch 248 having a first end 250 and a second end 252 is pivotably mounted to the distal end 246 of the flange 244 adjacent the forward surface 228 thereof. The pivotable mounting of the latch 248 to the flange 244 can be accomplished in any conventional manner such as by a pin 254 mounted within an aperture 256 as shown in FIG. 9. The second end 252 of the latch 248 preferably has a rounded end which preferably corresponds in outer radius to the groove 218 of the teeth 210 in the ratchet 204. A torsion spring 257 is provided between the lever 206 and the latch 248 which biases the latch 248 into a corresponding groove 218.

The plate 194 has a radial groove 195 therein which has several pins 272 (see FIGS. 10–11 ) located in a spaced circumferential relationship. The pins 272 extend through each of the gripping members 196 and prevent overtravel thereof when the gripping members 196 close.

The plate 194 of the rotary feed mechanism 190 is preferably discretely lockable in a number of positions whereby each of the gripping members 196 can be positioned adjacent both the exit point of the lateral extension 116 of the conduit 108 of the positioning mechanism 52 and adjacent the point at which the stud 38 is staked into the web 18 adjacent the opposite portion of the plate 194. This location of the various positions of the plate 194 is accomplished by a locating mechanism 258 mounted to the housing 202 as shown in FIG. 10. The locating mechanism 258 comprises a pin 260 having a central portion provided with a radially-extending lip 262. The pin 260 is mounted within a bore 264 of the housing 202 and biased outwardly therefrom by a spring 266. The pin 260 preferably has a distal end provided with a rounded cam surface 268 thereon.

The plate 194 further comprises a set of apertures 270. The set of apertures 270 are located adjacent the radial edge 198 of the plate 194 and are located at each portion of the plate 194 containing a gripping member 196 and are adapted to receive the pin 260 of the locating mechanism 258 so that, as the plate 194 rotates, the pin 260 in the locating mechanism 258 can engage successive apertures 270 in the plate 194.

A stud 38 contained in a gripping member 196 is rotated about the shaft 200 and moved from a position adjacent the lateral extension 116 of the conduit 108 through a number of discrete positions to a position whereby the stud can be inserted into the web 18 by the stud-driving assembly 208. The lever 206 is mounted upon the shaft 200 so that the latch 248, pivotably mounted to the rearward surface 230 of the flange 244, is engaged within a groove 218 of one of the teeth 210 on the ratchet 204 and held in place by the bias of the spring 257. The pin 260 is biased outwardly of the bore 264 and is positioned within one of the apertures 270 on the plate 194 to retain the plate 194 in a particular discrete position.

Figure 14:
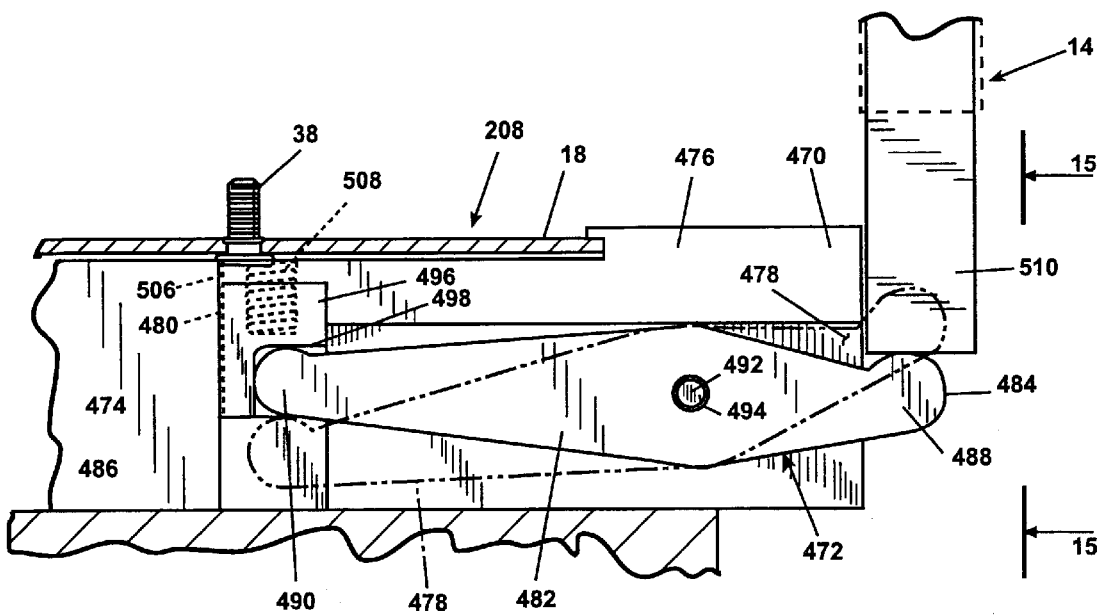
FIG. 14 is a side elevational view of a stud-driving assembly which is shown adapted to drive a stud into the web material passing between the upper and lower dies.
Figure 15:
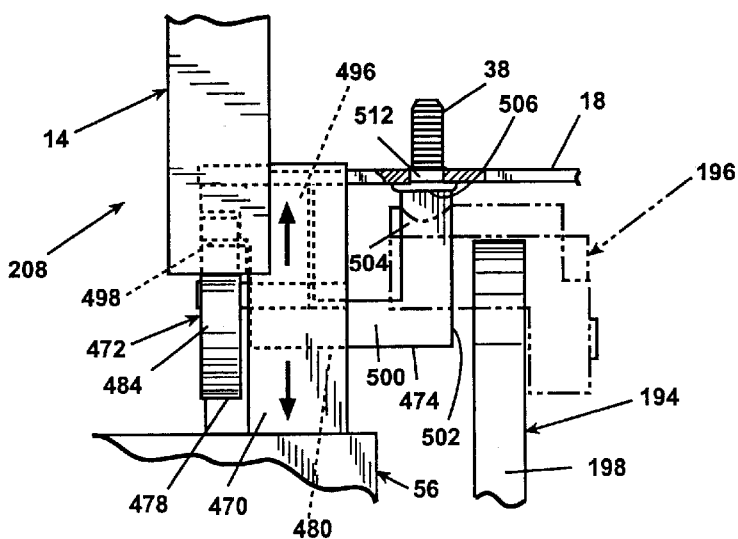
FIG. 15 is a rear elevational view of the stud-driving assembly of FIG. 14.

As shown in FIGS. 14–15, the stud-driving assembly 208 is preferably mounted adjacent the plate 194 on an opposite side thereof from the lever 206 so that the action of the stud-driving assembly as it stakes a stud 38 within the web 18 does not interfere with the rotation of the plate 194 or the other components of the staking mechanism 54. The stud-driving assembly 208 comprises a housing 470, a lever 472, and a hammer 474.

The housing 470 comprises a body 476 which can be formed integrally with the lower die 12 or as a separate component mounted adjacently thereto which has a longitudinal recess 478, and a lateral recess 480. The lever 472 is mounted within the longitudinal recess 478, and the hammer 474 is mounted within the lateral recess 480.

The lever 472 comprises an elongated body 482 having a first end 484 and a second end 486. The first end 484 of the lever 472 is provided with a rounded flange 488 thereon. The second end 486 of the lever 472 is also provided with a rounded flange 490. The lever 472 is pivotably mounted to the body 470 within the recess 478 in any conventional manner such as by a pin 492 mounted to the housing 470 which extends through an aperture 494 in the elongated body 482.

The hammer 474 comprises a body 496 provided with a recess 498 configured to receive the rounded flange 490 on the second end 486 of the lever 472. The body 496 of the hammer 474 further includes a laterally-extending beam 500 which has a distal end 502 provided with a vertical extension 504 thereon. The extension 504 has a distal end 506 which is adapted to contact a radially-extending body of a stud 38.

In assembly, the hammer 474 is slidably mounted within the lateral recess 480 of the housing 470 for slidable movement therein between a lowered position and a raised position as shown in FIG. 14. The rounded flange 490 of the second end 486 of the lever 472 is positioned within the recess 498 of the hammer 474 so that pivotable movement of the lever 472 actuates the hammer 474 between the lowered and raised positions. A spring 508 can be mounted in any suitable position, such as between the housing 470 and hammer 474, to bias the hammer 474 into the lowered position. The rounded flange 488 on the first end 484 of the lever 472 preferably extends beyond the longitudinal recess 478 of the housing 470 and is adapted to be contacted by a depending flange 510 provided as a portion of a forming tool on the upper die 14. Thus, as the upper die 14 is moved toward the lower die 12, the depending flange 510 contacts the rounded flange 488 on the first end 484 of the lever 472 and urges the first end 484 downwardly. This causes the lever 472 to be pivoted about the pin 492 and urges the rounded flange 490 on the second end 486 upwardly. Because the rounded flange 490 of the second end 486 of the lever 472 is engaged within the recess 498 on the hammer 474, the hammer 474 is urged upwardly in conjunction with the second end 486.

It will be understood that, when the second end 486 of the lever 472 is in a lowered position, the distal end 506 of the extension 504 of the hammer 474 is positioned beneath the gripping member 196 located directly beneath the web 18. As the second end 486 of the lever 472 is pivoted upwardly by the action of the depending flange 510 against the first end 484 of the lever 472, the hammer 474 is urged upwardly as well. The distal end 506 of the extension 504 of the hammer 474 thereby contacts the radially-extending body of the stud 38 retained within the gripping member 196 and urges the stud 38 out of the gripping member 196 and into the web 18. It will be understood that the stud 38 can preferably include an annular groove 512 adjacent the body of the stud 38 to aid the interengagement of the stud 38 with the web 18 as shown in FIG. 15.

The gripping members 196 are preferably adapted to releasably retain a stud 38 therein, but upon sufficient force provided to the radially-extending body of the stud 38, the gripping members 196 are adapted to release the stud 38 therefrom. FIGS. 12–13 show the gripping members 196 in greater detail. The gripping members 196 comprise first and second arms 280 and 282, respectively, each of which is pivotably mounted to the plate 194 by a pin 284 mounted within an aperture 286 located in each of the arms 280 and 282. A spring 288 extends between the first and second arms 280 and 282 to bias the arms 280 and 282 into a closed position wherein the arms 280 and 282 are positioned directly adjacent one another. In the closed position, the arms 280 and 282 can retain a stud 38 therebetween.

Each of the arms 280 and 282 include a raised wall 290 having a cam surface 292 thereon. The wall 290 and cam surface 292 are preferably formed on the arms 280 and 282 in a mirror image of one another. Thus, it will be understood that whether a stud 38 is urged laterally or axially between the raised walls 290 on the first and second arms 280 and 282, the urging of the body of the stud 38 against the raised walls 290 causes the stud 38 to force the first and second arms 280 and 282 apart against the bias of the spring 288. Once the stud 38 clears the cam surface 292 thereon, the bias of the spring 288 biases the first and second arms 280 and 282 back to the closed position and closes the arms 280 and 282 around the stud 38 to retain the stud 38 therebetween. Indentations 294 are provided on each arm 280, 282 which are closed around a corresponding pin 272 on the plate 194 to prevent overtravel of the arms 280, 282 as they close.

The operation of the stud-staking apparatus 42 will now be described as shown in FIGS. 2–15. Referring to FIGS. 2–6, a stud 38 is fed through the first end 76 of the conduit 74 and into the bore 92 of the car 80 via the second end 78 of the conduit 74. As the upper die 14 is lowered toward the lower die 12, the distal end 186 of the flange 184 abuts the flange 94 on the car 80. As the upper die 14 is further lowered, the angular surface 188 on the flange 184 contacts the ramped surface 98 of the flange 94 on the car 80. The action of the angular surface 188 of the flange 184 against the ramped surface 98 causes the car 80 to be moved toward the second end 66 of the passage 62 in the first end 58 of the body 56 as shown in FIGS. 2, 4 and 5.

When the stud 38 in the bore 92 is aligned with the aperture 68 in the passage 62, pressurized air is supplied through the aperture 68 via conduit 70 and fitting 72 to the bore 92 in the car 80. This causes the stud 38 to be "blown" into the conduit 108 in the body 56.

The radially-extending head of the stud 38 preferably rests on the ledge 120 of the side walls 118 of the conduit 108. The stud 38 travels through the conduit 108 via the burst of pressurized air supplied through the conduit 70.

It will be understood that the piston 126 of the cylinder 124 is positioned in the retracted position so that the distal end 128 thereof does not extend into the lateral extension 116 of the conduit 108. The stud 38 travels toward the second end 60 of the body 56 and through the turn 114 and into the lateral extension 116. The flange 168 located on the second end 166 of the lever 158 extends into the lateral extension 116 and prevents the stud 38 from exiting the lateral extension 116.

When it is desired to insert the stud 38 located in the lateral extension 116 into a gripping member 196 of the rotary feed mechanism 190, the cylinder 124 is supplied with a burst of pressurized air from the conduit 138 via the end 136 thereof. The piston 126 is axially extended from the cylinder 124. As the piston 126 is extended, the flange 168 on the first end 164 of the lever 158 rides against the piston 126. The flange 168 of the first end 164 of the lever 158 is further urged along the ramped surface 134 of the piston 126 as a result of the extension thereof. As the flange 168 passes the ramped surface 134 and onto the narrow portion 132 thereof, the distal end 128 of the piston 126 extends into the lateral extension 116 of the conduit 108. In addition, as the piston 126 is urged forwardly, it contacts the stud 38 and pushes it forwardly, causing the lever 158 to be pivoted about pin 160. As a result, the flange 168 of the second end 166 of the lever 158 is pivoted out of obstruction of the lateral extension 116. The lever 158 is allowed to pivot because the narrow portion 132 has been positioned adjacent the second end 166 due to the movement of the piston 126. The narrow portion 132 provides the necessary clearance to allow the stud 38 to be pivoted out of the lateral extension 116.

As the piston 126 is further extended from the cylinder 124, the indentation 130 on the distal end 128 of the piston 126 further pushes the stud 38 located in the lateral extension 116. The piston 126 is extended so that the stud 38 is engaged within the rounded indentation 130 and is pushed out of the lateral extension 116 of the conduit 108 and into the gripping member 196 located adjacent the exit of the lateral extension 116.

Once a stud 38 has been positioned onto a gripping member 196, it is the function of the rotary feed mechanism 190, and particularly the plate 194, to carry the stud 38 retained within the gripping members 196 from a position adjacent the exit of the lateral extension 116 of the conduit 108 to a position whereby the hammer 474 on the stud-driving assembly 208 can push the stud 38 into the web 18 to complete the staking of the stud 38 therein. As shown in FIGS. 7–8, several gripping members 196 are shown intermediate these two positions which carry studs 38 awaiting insertion into the web 18.

The rotation of the plate 194 through its discrete positions will now be described. It will be understood that the second end 252 of the latch 248 of the lever 206 is engaged within a groove 218 of one of the teeth 210 of the ratchet 204 which thereby retains the lever 206 in a particular position with respect to the ratchet 204 as shown in FIGS. 7–8 and in greater detail in FIG. 9. The plate 194 is releasably engaged to the lever 206 by the locating mechanism 258. More particularly, the cam surface 268 on the pin 260 is biased outwardly of the bore 264 in the housing 202 by the spring 266. As shown in FIG. 10, the pin 260 is lodged within one of the first apertures 270 on the plate 194 to retain the plate 194 in a desired locked position with respect to the housing 202.

The upper die 14 is preferably provided with a downwardly-depending flange 294 having a distal end 296 provided on the forming station located adjacent the rotary feed mechanism 190 as shown in FIGS. 7–8. As the upper die 14 is moved toward the lower die 12, the distal end 296 of the flange 294 contacts the rounded flange 232 on the first end 224 of the lever 206 and urges it downwardly. As the first end 224 of the lever 206 is pivoted downwardly, the distal end 252 of the latch 248 travels upwardly along the ramped surface 212 of the next successive tooth 210 on the ratchet 204. When the first end 224 is pivoted downwardly a sufficient extent by the flange 294 on the upper die 14, the distal end 252 of the latch 248 passes over the peak 216 on the next successive tooth 210 and is urged falls by the bias of spring 257 into the groove 218 of the next successive tooth 210 of the ratchet 204.

Once the flange 294 of the upper die 14 is lifted away from the lower die 12, the first end 224 of the lever 206 is again biased toward its raised position. As the first end 224 of the lever 206 travels towards the raised position, the distal end 252 of the latch 248 is engaged within the groove 218 of the next successive tooth 210 of the ratchet 204. As the first end 224 of the lever 206 travels toward the raised position, the engagement of the distal end 252 of the latch 248 in the groove 218 of the next successive tooth 210 of the ratchet 204 by the action of spring 257 urges the plate 194 to rotate to the next successive position. As the plate 194 begins rotating as a result of the force imparted thereto by the lever 206, the pin 260 is urged out of engagement with the aperture 270 in the plate 194 and rides along the surface of the plate 194. As the plate 194 approaches the next successive position, the pin 260 of the locating mechanism 258 is biased into the next successive aperture 270 on the plate 194 and locks the plate 194 in the next successive discrete position.

The operation of the stud-driving assembly 208 will now be described as shown in FIGS. 14 and 15. As the upper die 14 is moved toward the lower die 12, the depending flange 510 on the upper die contacts the rounded flange 488 located on the first end 484 of the lever 472. As the depending flange 510 is urged further downwardly by the upper die 14, the lever 472 is pivoted about the pin 492 so that the rounded flange 490 on the second end 486 of the lever 472 is urged upwardly. Because the hammer 474 receives the second end 486 of the lever 472 within the recess 498 thereof, the hammer 474 is urged upwardly within the lateral recess 480 of the housing 470 against the bias of the spring 508.

As the hammer 474 is moved upwardly by the second end 486 of the lever 472, the distal end 506 of the extension 504 of the hammer 474 contacts the stud 38 located in the gripping member 196 which is located adjacent the web 18. As the hammer 474 is urged further upwardly by the second end 486 of the lever 472, the arms 280 and 282 of the gripping member 196 are forced apart against the bias of spring 288 by the action of the radially extending body of the stud 38 against the cam surface 292 on the arms 280 and 282. The distal end 506 of the extension 504 thereby urges the stud 38 upwardly and free from engagement with the arms 280 and 282 of the gripping member 196 and into a pre-formed aperture in the web 18 where the stud 38 is lodged therein.

As the upper die 14 is moved upwardly with respect to the lower die 12, the flange 510 is lifted away from the first end 484 of the lever 472. The bias of the spring 508 thereby urges the hammer 474 downwardly within the lateral recess 480 of the housing 470 which, in turn, urges the second end 486 of the lever 472 downwardly therefrom. This downward pivoting of the second end 486 of the lever 472 repositions the first end 484 into the raised position as shown by the phantom outline in FIG. 14.

It will be understood that the length and configuration of the flanges 184, 294, and 510 can be selected so as to provide the actuation of the car 80, lever 206, and the lever 472 at the proper time to provide optimal results from the progressive die machine 10 during the operation thereof.

The bending apparatus 44 is shown in a lowered position in FIG. 16 and in a raised position in FIG. 17. It will be understood that when the bending apparatus 44 is located in the lowered position, less bend to the part 40 is formed to the part 40. In addition, when the bending apparatus 44 is positioned in the raised position, a more acute bend is provided to the part 40.

Referring to FIGS. 16–17, the bending apparatus 44 comprises a stepper motor 300, a motion converter 302, and an adjustable floor device 304. It will be understood that, although the bending apparatus 44 is shown in FIG. 1 at forming station 32, the bending apparatus 44 can be provided at any position in the progressive die machine 10 without departing from the scope of this invention. It will be further understood that the bending apparatus 44 can be configured as a separate device and retrofitted to a progressive die machine 10 or the progressive die device can be integrally manufactured with the progressive die machine 10.

The bending apparatus 44 is adapted to be located within the progressive die machine 10 between the lower and upper dies 12 and 14, respectively. It will be understood that the stepper motor 300 and the adjustable floor device are mounted to the lower die 12 by any conventional manner which is well known in the art. It will be further understood that the motion converter 302 is mounted between the motor 300 and the adjustable floor device 304.

The motor 300 can be any suitable device such as a housing 306 which contains a rotatable assembly which imparts rotary motion to an output shaft 308 extending axially therefrom. Preferably, the motor 300 is a direct current (DC) stepper motor which can accurately provide precise amounts of rotation to the output shaft 308 in discrete and/or continuous intervals.

The motion converter 302 comprises any suitable device for conversion of rotary motion to rectilinear motion. For example, as shown in FIG. 16, the motion converter 302 comprises a housing 310 adapted to receive the output shaft 308 at a first end 312 and having a second end 314 from which an output shaft 316 extends. The housing 310 preferably contains components which are commercially available and well known to convert rotary motion imparted to the output shaft 308 to linear motion which extend and retract the output shaft 316 axially with respect to the housing 310.

The adjustable floor device 304 comprises a lower portion 318 and an upper portion 320 mounted between a pair of stationary walls 322. The walls 322 are fixedly mounted to the lower die 12. The lower portion 318 includes a ramped surface 324 which abuts the upper portion 320. The lower portion 318 further has an end 326 mounted to a bracket 328 which, in turn, has a proximal end 330 adjacent the output shaft 316 of the motion converter 310. It will be understood that any axial movement imparted to the output shaft 316 of the motion converter 310 is imparted to the lower portion 318 of the adjustable floor device 304.

The upper portion 320 is slidably mounted within a recess 332 in the walls 322 so that the upper portion is movable with respect to the walls 322 but limited to a vertical direction. The upper portion 320 further has a lower surface 334 thereon which abuts the ramped surface 324 on the lower portion 318. A spring 336 is mounted axially on a shoulder fastener 338 which, in turn, is mounted to the upper portion 320 so that the shoulder fastener 338 downwardly biases the upper portion 320. The shoulder fastener 338 extends between the lower die 12 and the upper portion 320 through a longitudinal slot (not shown) in the lower portion 318 to allow for movement of the lower portion 318 with respect to the upper portion 320. The PLC 50 provides motion control to the motor 300.

It will be understood that the forming station 32 shown in FIG. 16 includes a tool 344 thereon which generally comprises a downwardly depending flange mounted to the upper die 14 and having a lower surface 346 thereon which is adapted to form an upper limit to the contouring operation performed by the bending apparatus 44. Further, the upper portion 320 of the adjustable floor device 304 includes an upper surface 348 thereon which is adapted to provide a lower limit to the contouring operation performed by the bending apparatus 44.

It will be understood that a part 40 formed by the web 18 is located between the lower and upper dies 12 and 14, respectively, as shown in FIG. 16. As is described elsewhere in this specification, the PLC 50 can send a signal to the motor 300 through connection 342 to impart a predetermined degree of rotation to the output shaft 308. The rotation of the shaft 308 is converted to axial movement of the output shaft 316 which is thereby extended or retracted depending upon the direction of rotation of the output shaft 308. A spring return (not shown) can be provided to urge the lower portion 318 toward the motor 300.

If the output shaft 316 is retracted toward the housing 310, the lower portion 318 is also slid toward the motion converter 302. The interaction between the ramped surface 324 of the lower portion 318 and the lower surface 334 of the upper portion 320 causes the upper portion 320 to be lowered with respect to the walls 322. The upper surface 348 of the upper portion 320 is thereby lowered a predetermined distance.

If the output shaft 316 is extended away from the housing 310, as shown along arrow A of FIG. 17, the lower portion 318 is also slid away from the motion converter 302. The interaction between the ramped surface 324 of the lower portion 318 and the lower surface 334 of the upper portion 320 causes the upper portion 320 to be raised with respect to the walls 322 as shown along arrow B of FIG. 17. The upper surface 348 of the upper portion 320 is thereby raised a predetermined distance.

It will be understood that the position of the upper surface 348 of the upper portion 320 of the adjustable floor device 304 determines the amount of bending introduced to the part 40 located at forming station 32 as the tool 344 is lowered with the upper die 14 during the stroke of the progressive die machine 10. The lower surface 346 of the tool 344 is brought into contact with the part 40 located there beneath and performs the bending of the part 40 by forcing the part 40 between the lower surface 346 of the tool 344 and the upper surface 348 of the upper portion 320 of the adjustable floor device 304.

Thus, upon an appropriate signal delivered to the motor 300, the upper surface 348 of the upper portion 320 can be adjusted to provide a lesser or greater degree of bending depending upon the direction of rotation of the output shaft 308 of the motor 300. This degree of bending is determined by a quality control signal generated from the measuring apparatus 46.

The measuring apparatus 46 is shown in FIG. 18 comprising an upper portion 350 and a lower portion 352. It will be understood that the measuring apparatus 46 can be manufactured as a separate assembly and retrofitted to an existing progressive die machine. Alternatively, the measuring apparatus 46 can be manufactured as an integral portion of a progressive die machine 10.

The upper portion 350 comprises a body 354 having an upper surface 356 and a lower surface 358. The body 354 is provided with several cylindrical bores 360 which extend through the body 354 between the upper and lower surfaces 356 and 358, respectively. The upper surface 356 of the body 354 can be provided with a mounting assembly, such as shaft 362 shown in FIG. 18, for mounting the upper portion 350 to the upper die 14 of the progressive die machine. Alternatively, the upper portion 350 can be mounted to a separate lifting assembly (not shown) for raising and lowering the upper portion 350 with respect to the lower portion 352. The lower surface 358 of the body 354 is provided with a central flange 364 extending outwardly therefrom. The central flange 364 is preferably provided with a downwardly-extending extension 366.

Each bore 360 in the upper portion 350 is adapted to receive a transducer 368 therein. Each of the transducers 368 in the upper portion 350 comprise a transformer 370 having a core mounted therein for axial movement with respect thereto. The transducers 368 are preferably mounted within the bores 360 of the upper portion 350 so that each of the cores 372 in the transducers 368 extends beyond the lower surface 358 of the upper portion 350.

The lower portion 352 of the measuring apparatus 46 comprises a body 374 having a table 376 mounted for vertical movement with respect to the body 374. As with the upper portion 350 of the measuring apparatus 46, the lower portion 352 can either be mounted as a unit to a lower die 12 of a progressive die machine 10 or mounted adjacent the die machine 10 downstream from the forming stations 20–36.

The body 374 of the lower portion 352 includes an upper surface 378 and a lower surface 380 having several cylindrical bores 382 extending therebetween. In addition, the body 374 of the lower portion 352 is provided with a pair of bearings 384 located adjacent each vertical side of the body 374. Preferably, the bores 382 are located intermediate the bearings 384.

The table 376 comprises a plate 386 having an upper surface 388 and a lower surface 390. Several apertures 392 extend through the plate 386 between the upper and lower surfaces 388 and 390, respectively. The apertures 392 are preferably located in a spaced lateral relationship with respect to one another. In addition, the apertures 392 and the plate 386 preferably correspond in vertical concentric alignment with the bores 382 in the body 374 of the lower portion 352. The lower surface 390 of the plate 386 is provided with at least two depending legs 394 located on adjacent opposite edges of the plate 386 which preferably correspond in vertical concentric alignment with the bearings 384 on the body 374.

The table 376 is mounted to the body 374 by journaling the legs 394 within the bearings 384 on the body 374.

Springs 396 are preferably disposed around the legs 394 between the lower surface 390 of the plate 386 and the upper surface 378 of the body 374 so that the table 376 is biased upwardly from the body 374. Further, transducers 398 having a transformer 400 and a core 402 mounted therein for axial movement with respect to the transformer 400 are provided in the bores 382 of the body 374. When the transducers 398 are mounted to the body 374, the cores 402 of each of the transducers 398 preferably extend through the apertures 392 in the plate 386 and beyond the upper surface 388 thereof.

It will be understood that the transducers 368 and 398 of the upper and lower portions 350 and 352, respectively, are properly interconnected to the A/D converter 408 through the signal conditioning device 410.

It will be further understood that one of the transducers 398 on the lower portion 352 is also designed as a trigger device shown in FIG. 18 by an additional reference numeral 406. The core 402 of the transducer 406 is preferably in vertical alignment with the extension 366 on the upper portion 350. The extension 366 and transducer 406 are preferably located either forwardly or rearwardly of a plane containing the remaining transducers 368 and 398 for reasons which will be obvious as explained below.

The trigger function of transducer 406 is to signal the initiation of the measurement process as well as provide a "zero" reference plane for comparison with the remaining transducer 398. As the web 18 having a formed part 40 thereon is fed between the upper portion 350 and the lower portion 352 of the measuring apparatus 46, the extension 366 on the upper portion 350 contacts the core 402 of the trigger transducer 406 which causes the core 402 to be retracted within the transformer 400 thereof. As the upper portion 350 continues to be lowered toward the lower portion 352, the cores 372 and 402 of the remaining transducers 368 and 398 are urged against upper and lower surfaces of the part 40 located therebetween. The lowering of the upper portion 350 toward the lower portion 352 causes the part 40 to be urged between the table 376 and the upper portion 350 so that the table 376 is urged downwardly against the bias of the springs 396 located between the body 374 and table 376. This ensures that all of the transducers 368 and 398 obtain contact with the part 40.

Once the transducers 368 on the upper portion 350 and the transducers 398 on the lower portion 352 have sufficiently contacted the part 40, data is sent to a conventional analog-to-digital converter (not shown) which provides data information from the transducers 368 and 398 to the PLC 50 through the connections 440.

Figure 19:
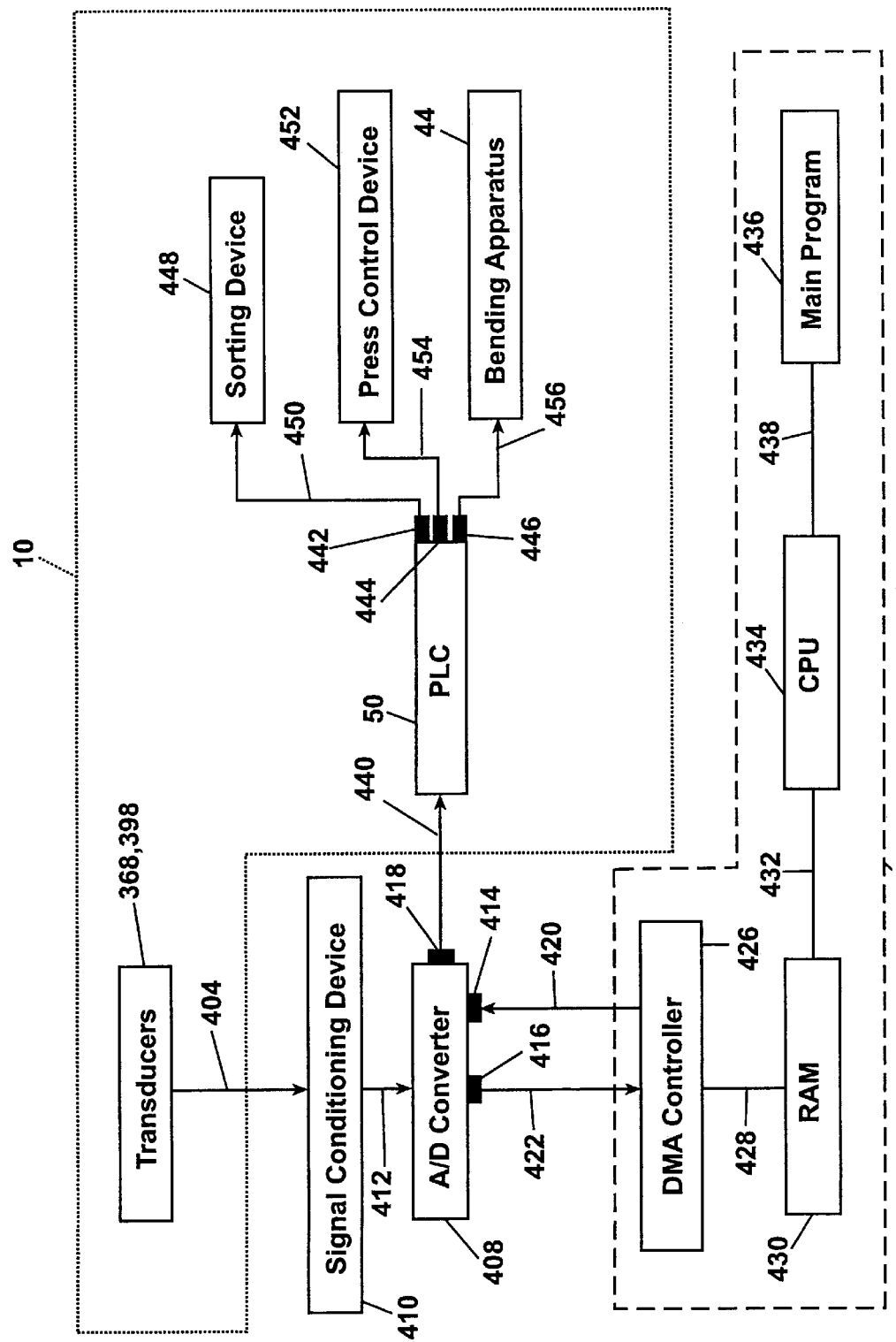
FIG. 19 is a diagrammatic view of the measuring apparatus of FIG. 18.

FIG. 19 shows a diagram of the process whereby a part 40 is measured by the measuring apparatus 46. As shown in FIG. 19, the transducers 368 and 398 send a signal through connections 404 to an analog-to-digital converter 408 (A/D converter). It will be understood that a signal conditioning device 410 can be mounted intermediate the transducers 368 and 398 and the A/D converter 408 and is interconnected therebetween by suitable connections 412.

The A/D converter 408 converts analog signals from the transducers 368 and 398 into a digital format in a conventional manner which is well known in the art. The A/D converter 408 has an input port 414 and first and second output ports 416 and 418. The input port 414 and first output port 416 are interconnected by suitable connections 420 and 422, respectively, to a direct memory access (DMA) controller 426 of a computer 424 DMA which, in turn, is interconnected by suitable connections 428 to a random access memory (RAM) buffer 430. The RAM 430 is interconnected by a suitable connection 432 to a central processing unit (CPU) 434 of any suitable type. An additional memory portion of the computer 424 contains a main program 436 which has access to the CPU 434 through a suitable connection 438.

As data is read by the transducers 368 and 398 regarding the part 40 located between the upper and lower portions 350 and 352, the data are sent through connection 404 through the signal conditioning device 410 and into the A/D converter 408. The data is thereby converted to a digital signal and sent through the first output port 416 and through connection 422 into the DMA controller 426 in the computer 424. The digital signals are thereafter sent through connection 428 and stored in the RAM 430.

The RAM 430, CPU 434 and main program 436 cooperate to determine whether the part 40 conforms with specifications for the part 40 which are preferably suitably stored within the computer 424. The RAM 430, CPU 434 and main program 436 cooperate to perform quality control analyses on the digital data stored in the RAM 430.

First, the specific measurements of the part 40 located between the upper portion 350 and lower portion 352 of the measuring apparatus 46 are compared with the part specifications stored in the computer 424 to determine whether the part 40 located within the measuring apparatus 46 falls within acceptable tolerance limits specified by the part specifications. If the part 40 located within the measuring apparatus 46 does not fall within acceptable tolerance limits as noted by the part specifications, an error signal, which is generally referred to as "flag 1," is generated and is sent out of the computer 424 to the input port 414 of the A/D converter 408.

The RAM 430, CPU 434 and main program 436 also track the number of consecutive "flag 1" error messages which were generated. If "flag 1" error messages were generated by the computer 424 for three consecutive parts 40 located in the measuring apparatus 46, a second error message, identified as "flag 2," is sent out of the computer 424 to the input port 414 of the A/D converter 408.

Third, the RAM 430, CPU 434 and main program 436 cooperate to compute a rolling average and variance of a previous predetermined number of parts 40 which have passed through the measuring apparatus 46. It has been found that computing a rolling average and variance for the previous ten parts 40 which have passed through the measuring apparatus 46 provides an acceptable measure of the current performance of the progressive die machine 10. However, a larger or smaller sample of the number of parts 40 passing through the measuring apparatus 46 can be computed without departing from the scope of this invention. If the most recently computed average and variance computations are determined to be too high or too low compared to the preferable values denoted by the part specifications, a third error message, noted here as "flag 3," is sent to the input port 414 of the A/D converter 408.

A value for the mean displacement of the transducers 368, 398 is calculated. The mean is calculated using the well known equation:

$$\mu = \frac{\sum_{i}^{n} x_i}{n}$$

where:

$X_i$=the individual reading from each transducer 368, 398 on the measuring apparatus 46;

n=the number of readings from the transducers 368, 398 which corresponds to the previous n parts passing through the measuring apparatus 46; and $\mu$=the calculated mean from the readings from transducers 368, 398.

A difference $\delta$ between the calculated mean $\mu$ and a target value $\tau$ of the parts formed is computed as follows:

$$\delta = \mu - \tau$$

where:

$\delta$=a calculated difference;

$\tau$=a predefined desired target value.

A control signal $\sigma$ is computed per the following formula:

$$\sigma = |\delta| - \lambda$$

where:

$\delta$=the difference as calculated above;

$\lambda$=a predefined tolerance limit for a formed part.

If necessary, the control signal is generated by the computer 424 and sent to the PLC 50 through the A/D converter 408 to adjust the bending apparatus 44.

The PLC 50 preferably has first, second and third output ports 442, 444 and 446, respectively. The first output port 442 is preferably interconnected to a sorting device 448 by a suitable connection 450. The sorting device 448 preferably comprises a discharge chute provided with a diverter mechanism (not shown) whereby acceptable parts are deposited into a first bin for accumulation and rejected parts are deposited into a second bin for later disposal or recycling. The sorting device 448 can accomplish this function using any suitable mechanism known in the art as the particular mechanism or device used to accomplish this function should not be interpreted as limiting the scope of this invention.

The second output port 444 is interconnected to a press control device 452 by a suitable connection 454. The press control device 452 can preferably, upon receipt of an appropriate signal, halt operation of the progressive die machine 10. As with the sorting device 448, the particular device used to accomplish the function of the press control device 452 should not be interpreted as limiting the scope of this invention.

The third output port 446 is interconnected to the bending apparatus 44 by a suitable connection 456. It will be understood that the bending apparatus 44 includes a controller (not shown) which is adapted to receive signals from the PLC through the connection 456.

Upon receipt of a particular message from the computer 424 through the A/D converter 408, the PLC 50 can, in turn, send an appropriate signal to the sorting device 448, the press control device 452 and/or the bending apparatus 44. For example, if "flag 1" is received by the PLC from the A/D converter 408, the PLC 50 sends a signal through the first output port 442 and connection 450 to the sorting device 448 to discard the particular part 40 which is located in the measuring apparatus 46. If "flag 1" is not received by the PLC 50, the part 40 is determined to be acceptable and will be deposited in a bin for accumulation.

If "flag 2" is received by the PLC 50 from the computer 424 through the A/D converter 408, the PLC 50 sends a suitable signal through the second output port 444 and connection 454 to the press control device 452 to halt operation of the progressive die machine 10. If "flag 2" is not received by the PLC 50, the operation of the progressive die machine 10 will be continued.

If "flag 3" is received by the PLC 50 from the computer 424 through the A/D converter 408, a suitable signal is sent through the third output port 446 and connection 456 to the bending apparatus 44 that the mean of a recent number of parts 40 passing through the measuring apparatus 46 are unacceptable with respect to the target part specification stored in the computer 424. A signal is sent to the stepper motor 300 to raise or lower the adjustable floor device 304 with respect to the upper die 14 so that subsequent parts 40 formed in the progressive die machine 10 at forming stations 20–36 correspond more closely to the specifications for the parts 40.

Figure 20:
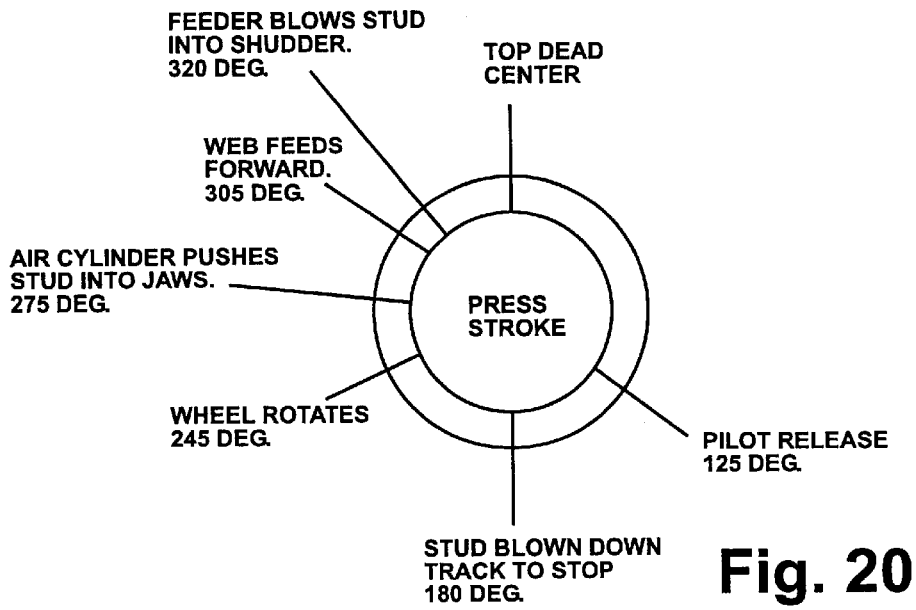
FIG. 20 is a diagrammatic view of the stroke of the progressive die machine of FIG. 1.

FIG. 20 shows a diagram which outlines the events which occur during the stroke of the progressive die machine 10. The events and the particular angle notation at which the identified events occur should not be interpreted as limiting the scope of this invention. It will be understood that the events shown can occur at other stroke angles without departing from the scope of this invention.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. An apparatus for serially making formed parts from a web of deformable material and with a stud mounted therein comprising:

a plurality of progressive die forming stations for forming multiple parts from the web by advancing the web through each forming station;

a feeding mechanism for feeding studs seriatim to a predetermined dispensing position adjacent to the web;

a driving mechanism adjacent to the web for inserting studs in spaced locations into the web;

a transfer mechanism operably connected to the feeding mechanism for receiving studs from the feeding mechanism and for transferring studs to the driving mechanism; and a cutting station for severing the web after the web has passed through the die forming stations and after the insertion of a stud into the formed parts to separate the formed parts from the web.

2. The apparatus of claim 1 wherein the driving mechanism is located adjacent to one of the die forming stations whereby the studs are inserted into the web as the parts are formed in the progressive die forming stations.

3. The apparatus of claim 2 wherein the die forming stations further comprise:

a moyable die having a driving ram associated therewith to reciprocate the movable die between a retracted and a deforming position to deform the web as the web is advanced through the forming stations;

the driving ram is operably connected to the driving mechanism to actuate the driving mechanism for inserting a stud into the web when the movable die is moved between the retracted and deforming positions.

4. The apparatus of claim 3 wherein the operable connection between the driving ram and the driving mechanism comprises:

one of a flange and a socket disposed on the movable die; and the other of the flange and the socket located on the driving mechanism;

whereby when the movable die is moved between the retracted and the deforming positions the flange is received in the socket.

5. The apparatus of claim 3 wherein the feeding mechanism is positioned adjacent one of the forming stations and is operably interconnected with the driving ram to index the seriatim feeding of the studs when the movable die is moved between the retracted and deforming positions.

6. The apparatus of claim 5 wherein the feeding mechanism comprises:

a shuttle car movable between a receiving position and a dispensing position and having an opening for receiving one of the studs therein when in the receiving position, the opening in the shuttle car is aligned with a conduit in the feeding mechanism, one end of the conduit is aligned with the opening in the shuttle car when in the dispensing position, the other end of the conduit is aligned with the transfer mechanism, the shuttle car having a cam follower; and a cam operably connected to the driving ram in register with the cam follower for moving the shuttle car from the receiving position to the dispensing position as the movable die moves between the retracted and deforming positions.

7. The apparatus of claim 6 wherein the feeding mechanism further comprises an actuator mounted adjacent to the shuttle car and adapted to move the stud out of the opening in the shuttle car into the conduit when the shuttle car is moved to the dispensing position.

8. The apparatus of claim 7 wherein the actuator comprises a pressurized air nozzle in register with the opening of the shuttle car in the dispensing position whereby air exiting the nozzle moves the stud into the conduit.

9. The apparatus of claim 8 wherein the feeding mechanism further comprises:

a lever mounted adjacent to an end of the conduit having a stop thereon movable between an obstructing position and a release position;

a cylinder having an axially-movable piston having an actuator portion thereon in register with the lever, the piston being movable between a first position wherein the actuator portion positions the lever in the obstructing position and a second position wherein the actuator portion positions the lever in the release position and forces the stud out of an exit of the conduit and into the transfer mechanism.

10. The apparatus of claim 9 wherein the piston further comprises a stud-receiving indentation which receives the stud as the piston moves from the first position to the second position for restricting the movement of the stud in a single linear direction.

11. The apparatus of claim 1 wherein the transfer mechanism positioned adjacent one of the forming stations and is operably interconnected with the driving ram to index the seriatim feeding of the studs between the feeding mechanism and the driving mechanism when the movable die is moved between the retracted and deforming positions.

12. The apparatus of claim 11 wherein the transfer mechanism comprises:

a support plate;

at least one set of gripping members mounted to the support plate and adapted to selectively grip a stud;

the support plate is mounted for movement of the at least one set of gripping members between the feeding mechanism and the driving mechanism;

whereby the at least one set of gripping members receive and grip a stud from the feeding mechanism, travel with the support plate to the driving mechanism, and release the stud at the driving mechanism.

13. The apparatus of claim 12 wherein the transfer mechanism further comprises an arm mounted to the support plate through a ratchet mechanism to selectively position the support plate at a number of discrete positions between the feeding mechanism and the driving mechanism.

14. The apparatus of claim 13 wherein the arm has a flange operably coupled to the driving ram so that the arm positions the support plate at a next discrete position as the movable die moves between the retracted and deforming positions.

15. The apparatus of claim 14 wherein the at least one set of gripping members comprises multiple sets of gripping members mounted to the support plate wherein one of the sets of gripping members is positioned at the feeding mechanism and another of the sets of gripping members is positioned at the driving mechanism at each discrete position of the support plate.

16. The apparatus of claim 15 wherein the driving mechanism is positioned adjacent one of the forming stations and is operably interconnected with the driving ram to index the seriatim insertion of the studs into the web when the movable die is moved between the retracted and deforming positions.

17. The apparatus of claim 16 wherein the driving mechanism comprises:

a driving mechanism housing;

a hammer slidably mounted within the housing and adjacent to the transfer mechanism for forcing each of the studs into the web; and a lever mounted to the housing for movement between a rest position and an insertion position and having a first end and a second end, the first end operably connected to the driving ram and the second end in register with the hammer, wherein hammer receives one of the studs when the lever is in the rest position and the hammer is moved by the lever to insert the stud into the web when the lever moves between the rest and insertion positions;

whereby the lever is moved between the rest position and the insertion position when the movable die is moved between the retracted position and the deforming position.

18. The apparatus of claim 1 wherein the die forming stations further comprise:

a movable die having a driving ram associated therewith to reciprocate the movable die between a retracted and a deforming position to deform the web as the web is advanced through the forming stations;

the driving ram is operably connected to the driving mechanism to actuate the driving mechanism for inserting a stud into the web when the movable die is moved between the retracted and deforming positions.

19. The apparatus of claim 18 wherein the operable connection between the driving ram and the driving mechanism comprises:

one of a flange and a socket disposed on the movable die; and the other of the flange and the socket located on the driving mechanism;

whereby when the movable die is moved between the retracted and the deforming positions the flange is received in the socket.

20. The apparatus of claim 1 wherein the feeding mechanism is positioned adjacent one of the forming stations and is operably interconnected with a driving ram to index the seriatim feeding of the studs when a movable die is moved between retracted and deforming positions.

21. The apparatus of claim 20 wherein the feeding mechanism comprises:
   a shuttle car movable between a receiving position and a dispensing position and having an opening for receiving one of the studs therein when in the receiving position, the opening in the shuttle car is aligned with a conduit in the feeding mechanism, one end of the conduit is aligned with the opening in the shuttle car when in the dispensing position, the other end of the conduit is aligned with the transfer mechanism, the shuttle car having a cam follower; and
   a cam operably connected to the driving ram in register with the cam follower for moving the shuttle car from the receiving position to the dispensing position as the movable die moves between the retracted and deforming positions.

22. The apparatus of claim 1 wherein the feeding mechanism further comprises an actuator mounted adjacent to a shuttle car having an opening and adapted to move the stud out of the opening in the shuttle car into a conduit when the shuttle car is moved to a dispensing position.

23. The apparatus of claim 22 wherein the actuator comprises a pressurized air nozzle in register with the opening of the shuttle car in the dispensing position whereby air exiting the nozzle moves the stud into the conduit.

24. The apparatus of claim 1 wherein the feeding mechanism further comprises:
   a conduit extending between the feeding mechanism and the transfer mechanism;
   a lever mounted adjacent to an end of the conduit having a stop thereon movable between an obstructing position and a release position;
   a cylinder having an axially-movable piston having an actuator portion thereon in register with the lever, the piston being movable between a first position wherein the actuator portion positions the lever in the obstructing position and a second position wherein the actuator portion positions the lever in the release position and forces the stud out of an exit of the conduit and into the transfer mechanism.

25. The apparatus of claim 24 wherein the piston further comprises a stud-receiving indentation which receives the stud as the piston moves from the first position to the second position for restricting the movement of the stud in a single linear direction.

26. The apparatus of claim 1 wherein the transfer mechanism is positioned adjacent one of the forming stations and is operably interconnected with a driving ram to index the seriatim feeding of the studs between the feeding mechanism and the driving mechanism when a movable die is moved between retracted and deforming positions.

27. The apparatus of claim 26 wherein the transfer mechanism comprises:
   a support plate;
   at least one set of gripping members mounted to the support plate and adapted to selectively grip a stud;
   the support plate is mounted for movement of the at least one set of gripping members between the feeding mechanism and the driving mechanism;
   whereby the at least one set of gripping members receive and grip a stud from the feeding mechanism, travel with the support plate to the driving mechanism, and release the stud at the driving mechanism.

28. The apparatus of claim 1 wherein the transfer mechanism further comprises an arm mounted to a support plate through a ratchet mechanism to selectively position the support plate at a number of discrete positions between the feeding mechanism and the driving mechanism.

29. The apparatus of claim 28 wherein the arm has a flange operably coupled to a driving ram so that the arm positions the support plate at a next discrete position as a movable die moves between retracted and deforming positions.

30. The apparatus of claim 29 wherein the at least one set of gripping members comprises multiple sets of gripping members mounted to the support plate wherein one of the sets of gripping members is positioned at the feeding mechanism and another of the sets of gripping members is positioned at the driving mechanism at each discrete position of the support plate.

31. The apparatus of claim 1 wherein the driving mechanism is positioned adjacent one of the forming stations and is operably interconnected with a driving ram to index the seriatim insertion of the studs into the web when a movable die is moved between retracted and deforming positions.

32. The apparatus of claim 31 wherein the driving mechanism comprises:
   a driving mechanism housing;
   a hammer slidably mounted within the housing and adjacent to the transfer mechanism for forcing each of the studs into the web; and
   a lever mounted to the housing for movement between a rest position and an insertion position and having a first end and a second end, the first end operably connected to the driving ram and the second end in register with the hammer, wherein hammer receives one of the studs when the lever is in the rest position and the hammer is moved by the lever to insert the stud into the web when the lever moves between the rest and insertion positions;
   whereby the lever is moved between the rest position and the insertion position when the movable die is moved between retracted and deforming positions.

33. An apparatus for serially making formed parts from a web of deformable material and with a stud mounted therein comprising:
   a plurality of progressive die forming stations for forming multiple parts from the web by advancing the web through each forming station, wherein the plurality of die forming stations further comprises a movable die having a driving ram associated therewith to reciprocate the movable die between a retracted and a deforming position to deform the web as the web is advanced through the forming stations, and the driving ram is operably connected to a driving mechanism to actuate the driving mechanism for inserting a stud into the web when the movable die is moved between the retracted and deforming positions;
   a feeding mechanism for feeding studs seriatim to a predetermined dispensing position adjacent to the web;
   the driving mechanism is positioned adjacent to the web for inserting studs in spaced locations into the web, wherein the driving mechanism is located adjacent to one of the die forming stations whereby the studs are inserted into the web as the parts are formed in the progressive die forming stations, wherein the operable connection between the driving ram and the driving mechanism comprises one of a flange and a socket disposed on the movable die, and the other of the flange and the socket located on the driving mechanism whereby when the movable die is moved between the retracted and the deforming positions the flange is received in the socket;

a transfer mechanism operably connected to the feeding mechanism for receiving studs from the feeding mechanism and for transferring studs to the driving mechanism; and a cutting station for severing the web after the web has passed through the die forming stations to separate the formed individual stud-bearing parts from the web.

34. The apparatus of claim 33 wherein the feeding mechanism is positioned adjacent one of the forming stations and is operably interconnected with the driving ram to index the seriatim feeding of the studs when the movable die is moved between the retracted and deforming positions.

35. The apparatus of claim 34 wherein the feeding mechanism comprises:

a shuttle car movable between a receiving position and a dispensing position and having an opening for receiving one of the studs therein when in the receiving position, the opening in the shuttle car is aligned with a conduit in the feeding mechanism, one end of the conduit is aligned with the opening in the shuttle car when in the dispensing position, the other end of the conduit is aligned with the transfer mechanism, the shuttle car having a cam follower; and a cam operably connected to the driving ran in register with the cam follower for moving the shuttle car from the receiving position to the dispensing position as the movable die moves between the retracted and deforming positions.

36. The apparatus of claim 35 wherein the feeding mechanism further comprises an actuator mounted adjacent to the shuttle car and adapted to move the stud out of the opening in the shuttle car into the conduit when the shuttle car is moved to the dispensing position.

37. The apparatus of claim 36 wherein the actuator comprises a pressurized air nozzle in register with the opening of the shuttle car in the dispensing position whereby air exiting the nozzle moves the stud into the conduit.

38. The apparatus of claim 37 wherein the feeding mechanism further comprises:

a lever mounted adjacent to an end of the conduit having a stop thereon movable between an obstructing position and a release position;

a cylinder having an axially-movable piston having an actuator portion thereon in register with the lever, the piston being movable between a first position wherein the actuator portion positions the lever in the obstructing position and a second position wherein the actuator portion positions the lever in the release position and forces the stud out of an exit of the conduit and into the transfer mechanism.

39. The apparatus of claim 38 wherein the piston further comprises a stud-receiving indentation which receives the stud as the piston moves from the first position to the second position for restricting the movement of the stud in a single linear direction.

40. An apparatus for serially making formed parts from a web of deformable material and with a stud mounted therein comprising:

a plurality of progressive die forming stations for forming multiple parts from the web by advancing the web through each forming station;

a feeding mechanism for feeding studs seriatim to a predetermined dispensing position adjacent to the web;

a driving mechanism adjacent to the web for inserting studs in spaced locations into the web;

a transfer mechanism operably connected to the feeding mechanism for receiving studs from the feeding mechanism and for transferring studs to the driving mechanism, wherein the transfer mechanism positioned adjacent one of the forming stations and is operably interconnected with a driving ram having a movable die to index the seriatim feeding of the studs between the feeding mechanism and the driving mechanism when the movable die is moved between retracted and deforming positions, wherein the transfer mechanism further comprises:

a support plate;

at least one set of gripping members mounted to the support plate and adapted to selectively grip a stud;

the support plate is mounted for movement of the at least one set of gripping members between the feeding mechanism and the driving mechanism;

whereby the at least one set of gripping members receive and grip a stud from the feeding mechanism, travel with the support plate to the driving mechanism, and release the stud at the driving mechanism; and a cutting station for severing the web after the web has passed through the die forming stations to separate individual stud-bearing formed parts from the web.

41. The apparatus of claim 40 wherein the transfer mechanism further comprises an arm mounted to the support plate through a ratchet mechanism to selectively position the support plate at a number of discrete positions between the feeding mechanism and the driving mechanism.

42. The apparatus of claim 41 wherein the arm has a flange operably coupled to the driving ram so that the arm positions the support plate at a next discrete position as the movable die moves between retracted and deforming positions.

43. The apparatus of claim 41 wherein the at least one set of gripping members comprises multiple sets of gripping members mounted to the support plate wherein one of the sets of gripping members is positioned at the feeding mechanism and another of the sets of gripping members is positioned at the driving mechanism at each discrete position of the support plate.

44. The apparatus of claim 43 wherein the driving mechanism is positioned adjacent one of the forming stations and is operably interconnected with the driving ram to index the seriatim insertion of the studs into the web when the movable die is moved between the retracted and deforming positions.

45. The apparatus of claim 44 wherein the driving mechanism comprises:

a driving mechanism housing;

a hammer slidably mounted within the housing and adjacent to the transfer mechanism for forcing each of the studs into the web; and a lever mounted to the housing for movement between a rest position and an insertion position and having a first end and a second end, the first end operably connected to the driving ram and the second end in register with the hammer, wherein hammer receives one of the studs when the lever is in the rest position and the hammer is moved by the lever to insert the stud into the web when the lever moves between the rest and insertion positions;

whereby the lever is moved between the rest position and the insertion position when the movable die is moved between the retracted position and the deforming position.

46. An apparatus for serially making formed parts from a web of deformable material and with a stud mounted therein comprising:

a plurality of progressive die forming stations for forming multiple parts from the web by advancing the web through each forming station, wherein the die forming stations further comprise a movable die having a driving ram associated therewith to reciprocate the movable die between a retracted and a deforming position to deform the web as the web is advanced through the forming stations;

a feeding mechanism for feeding studs seriatim to a predetermined dispensing position adjacent to the web;

a driving mechanism adjacent to the web for inserting studs in spaced locations into the web, wherein the driving ram is operably connected to the driving mechanism to actuate the driving mechanism for inserting a stud into the web when the movable die is moved between the retracted and deforming positions;

a transfer mechanism operably connected to the feeding mechanism for receiving studs from the feeding mechanism and for transferring studs to the driving mechanism; and a cutting station for severing the web after the web has passed through the die forming stations to separate formed individual stud-bearing parts from the web.

47. The apparatus of claim 46 wherein the operable connection between the driving ram and the driving mechanism comprises:

one of a flange and a socket disposed on the movable die; and the other of the flange and the socket located on the driving mechanism;

whereby when the movable die is moved between the retracted and the deforming positions the flange is received in the socket.

48. An apparatus for serially making formed parts from a web of deformable material and with a stud mounted therein comprising:

a plurality of progressive die forming stations for forming multiple parts from the web by advancing the web through each forming station;

a feeding mechanism for feeding studs seriatim to a predetermined dispensing position adjacent to the web, wherein the feeding mechanism is positioned adjacent one of the forming stations and is operably interconnected with a driving ram to index the seriatim feeding of the studs when a movable die is moved between retracted and deforming positions;

a driving mechanism adjacent to the web for inserting studs in spaced locations into the web;

a transfer mechanism operably connected to the feeding mechanism for receiving studs from the feeding mechanism and for transferring studs to the driving mechanism; and a cutting station for severing the web after the web has passed through the die forming stations to separate formed individual stud-bearing parts from the web.

49. The apparatus of claim 48 wherein the feeding mechanism comprises:

a shuttle car movable between a receiving position and a dispensing position and having an opening for receiving one of the studs therein when in the receiving position, the opening in the shuttle car is aligned with a conduit in the feeding mechanism, one end of the conduit is aligned with the opening in the shuttle car when in the dispensing position, the other end of the conduit is aligned with the transfer mechanism, the shuttle car having a cam follower; and a cam operably connected to the driving ram in register with the cam follower for moving the shuttle car from the receiving position to the dispensing position as the movable die moves between the retracted and deforming positions.

50. The apparatus of claim 49 wherein the feeding mechanism further comprises an actuator mounted adjacent to the shuttle car and adapted to move the stud out of the opening in the shuttle car into the conduit when the shuttle car is moved to the dispensing position.

51. The apparatus of claim 50 wherein the actuator comprises a pressurized air nozzle in register with the opening of the shuttle car in the dispensing position whereby air exiting the nozzle moves the stud into the conduit.

52. The apparatus of claim 51 wherein the feeding mechanism further comprises:

a lever mounted adjacent to an end of the conduit having a stop thereon movable between an obstructing position and a release position;

a cylinder having an axially-movable piston having an actuator portion thereon in register with the lever, the piston being movable between a first position wherein the actuator portion positions the lever in the obstructing position and a second position wherein the actuator portion positions the lever in the release position and forces the stud out of an exit of the conduit and into the transfer mechanism.

53. The apparatus of claim 52 wherein the piston further comprises a stud-receiving indentation which receives the stud as the piston moves from the first position to the second position for restricting the movement of the stud in a single linear direction.

54. An apparatus for serially making formed parts from a web of deformable material and with a stud mounted therein comprising:

a plurality of progressive die forming stations for forming multiple parts from the web by advancing the web through each forming station;

a feeding mechanism for feeding studs seriatim to a predetermined dispensing position adjacent to the web;

a driving mechanism adjacent to the web for inserting studs in spaced locations into the web;

a transfer mechanism operably connected to the feeding mechanism for receiving studs from the feeding mechanism and for transferring studs to the driving mechanism, wherein the transfer mechanism positioned adjacent one of the forming stations and is operably interconnected with a driving ram having a movable die to index the seriatim feeding of the studs between the feeding mechanism and the driving mechanism when the movable die is moved between retracted and deforming positions; and a cutting station for severing the web after the web has passed through the die forming stations to separate formed individual stud-bearing parts from the web.

55. The apparatus of claim 54 wherein the transfer mechanism comprises:

a support plate;

at least one set of gripping members mounted to the support plate and adapted to selectively grip a stud;

the support plate is mounted for movement of the at least one set of gripping members between the feeding mechanism and the driving mechanism;

whereby the at least one set of gripping members receive and grip a stud from the feeding mechanism, travel with the support plate to the driving mechanism, and release the stud at the driving mechanism.

56. The apparatus of claim 55 wherein the transfer mechanism further comprises an arm mounted to the support plate through a ratchet mechanism to selectively position the support plate at a number of discrete positions between the feeding mechanism and the driving mechanism.

57. The apparatus of claim 56 wherein the arm has a flange operably coupled to the driving ram so that the arm positions the support plate at a next discrete position as the movable die moves between the retracted and deforming positions.

58. The apparatus of claim 57 wherein the at least one set of gripping members comprises multiple sets of gripping members mounted to the support plate wherein one of the sets of gripping members is positioned at the feeding mechanism and another of the sets of gripping members is positioned at the driving mechanism at each discrete position of the support plate.

59. An apparatus for serially making formed parts from a web of deformable material and with a stud mounted therein comprising:

a plurality of progressive die forming stations for forming multiple parts from the web by advancing the web through each forming station;

a feeding mechanism for feeding studs seriatim to a predetermined dispensing position adjacent to the web;

a driving mechanism adjacent to the web for inserting studs in spaced locations into the web, wherein the driving mechanism is positioned adjacent one of the forming stations and is operably interconnected with a driving ram having a movable die to index the seriatim insertion of the studs into the web when the movable die is moved between retracted and deforming positions, wherein the driving mechanism further comprises:

a driving mechanism housing;

a hammer slidably mounted within the housing and adjacent to the transfer mechanism for forcing each of the studs into the web; and a lever mounted to the housing for movement between a rest position and an insertion position and having a first end and a second end, the first end operably connected to the driving ram and the second end in register with the hammer, wherein hammer receives one of the studs when the lever is in the rest position and the hammer is moved by the lever to insert the stud into the web when the lever moves between the rest and insertion positions;

whereby the lever is moved between the rest position and the insertion position when the movable die is moved between the retracted position and the deforming position;

a transfer mechanism operably connected to the feeding mechanism for receiving studs from the feeding mechanism and for transferring studs to the driving mechanism; and a cutting station for severing the web after the web has passed through the die forming stations to separate formed individual stud-bearing parts from the web.

* * * * *

UNITED STATES PATENT AND TRADEMARK OFFICE
CERTIFICATE OF CORRECTION

PATENT NO. : 6,418,611 B1
DATED : July 16, 2002
INVENTOR(S) : Ronald E. Weber et al.

It is certified that error appears in the above-identified patent and that said Letters Patent is hereby corrected as shown below:

Column 22,
Line 54, "moyable" should be -- movable --.

Column 27,
Line 30, "ran" should be -- ram --.

Column 28,
Line 40, "claim 41" should be -- claim 42 --.

Signed and Sealed this

Seventeenth Day of December, 2002

JAMES E. ROGAN
*Director of the United States Patent and Trademark Office*